United States Patent
Shimizu et al.

(10) Patent No.: US 10,054,427 B2
(45) Date of Patent: Aug. 21, 2018

(54) ORIENTATION VARIATION MEASUREMENT SYSTEM, SATELLITE, AND ORIENTATION VARIATION MEASUREMENT METHOD

(71) Applicant: Mitsubishi Electric Corporation, Chiyoda-ku (JP)

(72) Inventors: Seiichi Shimizu, Chiyoda-ku (JP); Kazuhide Kodeki, Chiyoda-ku (JP); Masaki Haruna, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 3 days.

(21) Appl. No.: 15/115,191

(22) PCT Filed: Feb. 5, 2015

(86) PCT No.: PCT/JP2015/053249
§ 371 (c)(1),
(2) Date: Jul. 28, 2016

(87) PCT Pub. No.: WO2015/122349
PCT Pub. Date: Aug. 20, 2015

(65) Prior Publication Data
US 2016/0341547 A1   Nov. 24, 2016

(30) Foreign Application Priority Data
Feb. 13, 2014   (JP) .................... 2014-025846

(51) Int. Cl.
*G01B 11/14* (2006.01)
*B64G 1/66* (2006.01)
(Continued)

(52) U.S. Cl.
CPC ............ *G01B 11/14* (2013.01); *B64G 1/1021* (2013.01); *B64G 1/66* (2013.01); *G01B 11/272* (2013.01);
(Continued)

(58) Field of Classification Search
CPC ..... G01B 11/14; G01B 11/272; G01B 11/002; G01B 11/26; G01B 11/00; G01B 11/03;
(Continued)

(56) References Cited

U.S. PATENT DOCUMENTS 4,123,168 A * 10/1978 Howell .................. G01B 11/26
356/139.03
4,492,465 A *  1/1985 Erdmann ............... G01B 11/26
250/202
(Continued)

FOREIGN PATENT DOCUMENTS

JP   H02-143214   * 11/1988 ............ G02B 17/00
JP   H07-87028    *  6/1993 ............ H04B 10/00
(Continued)

OTHER PUBLICATIONS

International Search Report dated Apr. 14, 2015, in PCT/JP2015/053249 Filed Feb. 5, 2015.

*Primary Examiner* — Mohamed K Amara
(74) *Attorney, Agent, or Firm* — Oblon, McClelland, Maier & Neustadt, L.L.P.

(57) ABSTRACT

Parallel laser light beams are irradiated from different positions into a telescope. Beams of laser light are incident on a secondary minor attitude detection minor from different locations. Laser light detectors detect each beam of laser light reflected by the secondary minor attitude detection minor. A first attitude calculator determines an amount of attitude variation of a secondary minor based on a result detected by the laser light detectors. The laser light detectors
(Continued)

detect each beam of the laser light reflected by the primary minor and the secondary minor after entering the telescope. A second attitude calculator determines an amount of attitude variation of the primary minor based on a result detected by the laser light detectors and the result detected by the laser light detectors.

14 Claims, 14 Drawing Sheets

(51) Int. Cl.
  *B64G 1/10* (2006.01)
  *G01S 5/16* (2006.01)
  *G01J 1/04* (2006.01)
  *H04B 10/112* (2013.01)
  *G01B 11/27* (2006.01)

(52) U.S. Cl.
  CPC ............. *G01J 1/0429* (2013.01); *G01S 5/163* (2013.01); *H04B 10/1121* (2013.01)

(58) Field of Classification Search
  CPC ..... G01B 7/30; H04B 10/1121; G01J 1/0429; G01S 5/163; G01S 17/66; G01S 5/16; G01S 11/12; G01S 17/87; G01S 5/0247; G01S 17/00; G01S 13/876; G01S 19/51; B64G 1/1021; B64G 1/66; B64G 1/288
  See application file for complete search history.

(56) References Cited

U.S. PATENT DOCUMENTS

| | | | | |
|---|---|---|---|---|
| 4,664,517 A | * | 5/1987 | Guthrie | ................... G01B 11/26 356/138 |
| 6,293,027 B1 | * | 9/2001 | Elliott | ................... G01B 11/002 33/286 |
| 2009/0251773 A1 | * | 10/2009 | Danziger | ............. B64G 1/1021 359/367 |
| 2015/0077547 A1 | * | 3/2015 | Choiniere | .............. G01B 11/26 348/135 |
| 2015/0292977 A1 | * | 10/2015 | Kodeki | ............. G01M 11/0221 356/127 |
| 2016/0025489 A1 | * | 1/2016 | Klepsvik | ................. G01S 17/42 356/5.01 |

FOREIGN PATENT DOCUMENTS

| | | | | | |
|---|---|---|---|---|---|
| JP | 6-50767 A | | 2/1994 | | |
| JP | H11-344736 | * | 6/1998 | ............... | G03B 5/00 |
| JP | 2002228543 A | * | 8/2002 | ............ | G01M 11/02 |
| JP | 2004-145422 A | | 5/2004 | | |
| JP | 2007085788 A | * | 4/2007 | ........... | G01M 11/00 |
| JP | 2010-15002 A | | 1/2010 | | |
| JP | 2012-103487 A | | 5/2012 | | |

\* cited by examiner

ORIENTATION VARIATION MEASUREMENT SYSTEM, SATELLITE, AND ORIENTATION VARIATION MEASUREMENT METHOD

TECHNICAL FIELD

The present disclosure relates to a pointing variation measuring system, a satellite, and a pointing variation measuring method.

BACKGROUND ART

High observation accuracy is required of an optical sensor aboard a satellite or the like. To meet the requirement, an error of the optical axis (pointing direction) of an optical system including a lens, a minor, and others in such an optical sensor is measured to adjust alignment in the optical sensor.

For example, an alignment measurement apparatus disclosed in Patent Literature 1 measures an error of an optical axis of a reflective condenser optical system in the optical sensor. This alignment measurement apparatus includes a laser light output unit for outputting laser light in multiple directions and a plurality of light receiving elements for receiving through a minor the laser light output by the laser light output unit. The alignment measurement apparatus detects an error of an optical axis in the optical sensor based on the light signal received by the plurality of light receiving elements.

CITATION LIST

Patent Literature

Patent Literature 1: Unexamined Japanese Patent Application Kokai Publication No. H6-50767

SUMMARY OF INVENTION

Technical Problem

For the measurement apparatus of Patent Literature 1, the laser light output by the laser light output unit is guided through a minor, a primary minor, and a secondary minor to the light receiving element. Thus, the measurement apparatus of Patent Literature 1 measures the error of the optical axis without separating an amount of attitude variation of the primary minor from an amount of attitude variation of the secondary minor. This means that the individual amounts of attitude variation of the primary and secondary minors are not detectable.

The present disclosure has been made in view of the foregoing, and an objective of the present disclosure is to provide a pointing variation measuring system, a satellite, and a pointing variation measuring method, which are capable of measuring individual amounts of attitude variation (displacement) of the primary and secondary minors of the reflective condenser optical system.

Solution to Problem

A pointing variation measuring system according to the present disclosure includes a secondary minor attitude detection minor disposed on a secondary minor of a reflective condenser optical system including a primary minor and the secondary minor; a laser light output unit to irradiate the reflective condenser optical system with at least two parallel beams of laser light from respective different locations and irradiate the secondary minor attitude detection minor with at least two additional beams of laser light from respective different locations; a first laser light detector unit to detect each beam of laser light reflected by the secondary minor attitude detection minor; a first attitude calculator to determine, based on a result detected by the first laser light detector unit, an amount of attitude variation that is a deviation between a reference attitude of the secondary minor and a current attitude of the secondary minor; a second laser light detector unit to detect each beam of laser light reflected by the primary minor and the secondary minor after entering the reflective condenser optical system; and a second attitude calculator to determine, based on a result detected by the second laser light detector unit and the result detected the first laser light detector unit, an amount of attitude variation that is a deviation between a reference attitude of the primary minor and a current attitude of the primary minor.

Advantageous Effects of Invention

According to the present disclosure, detection of beams of laser light each reflected by a secondary minor attitude detection minor disposed on a secondary minor of a reflective condenser optical system and detection of beams of laser light each reflected by a primary minor and the secondary minor after entering the reflective condenser optical system enable detection of individual amounts of attitude variation (displacement) of the primary minor and the secondary minor to separately measure the amounts of attitude variation (displacement) of the primary minor and the secondary minor.

DESCRIPTION OF EMBODIMENTS

Embodiment 1

Figure 1:
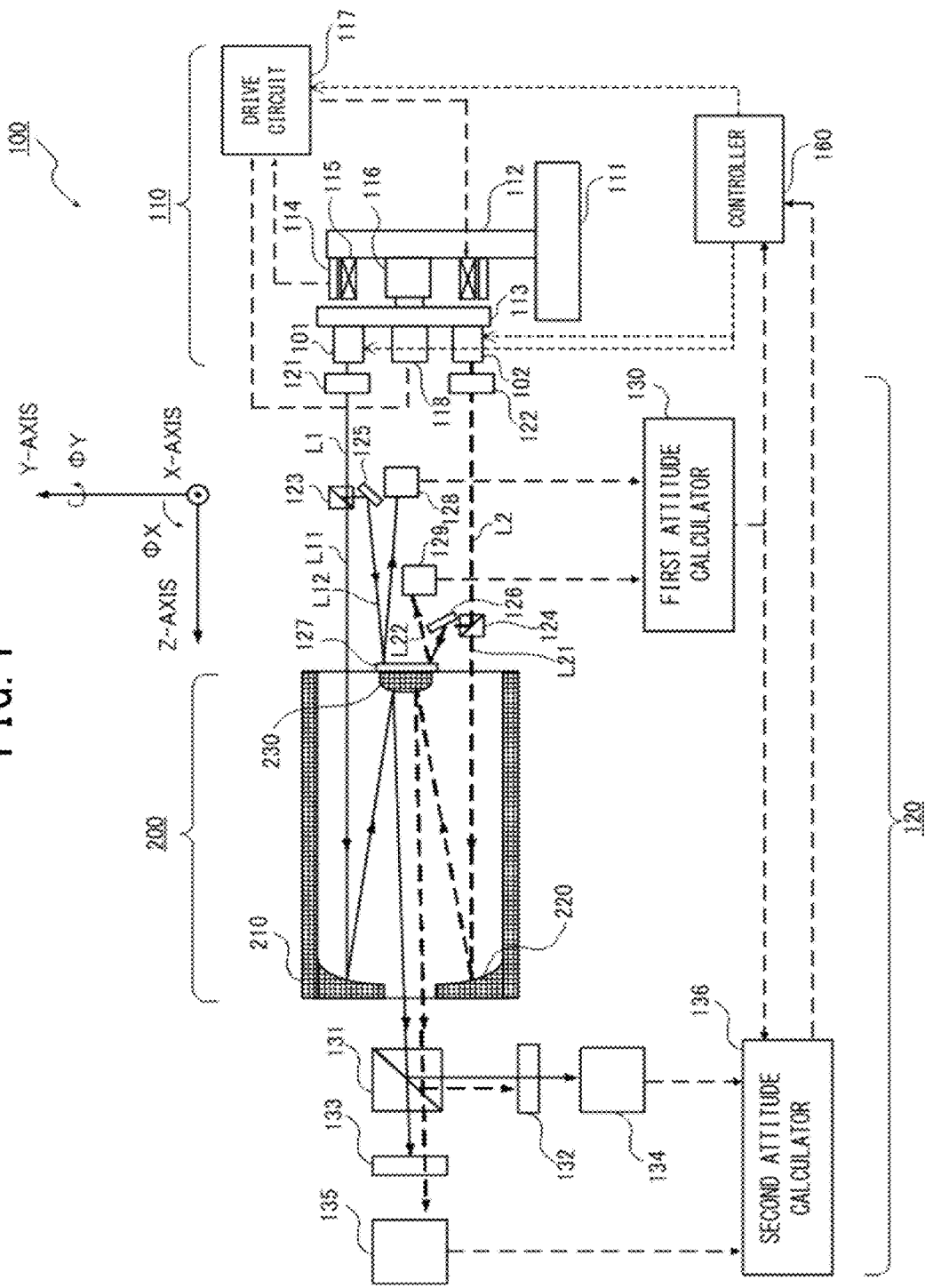
FIG. 1 is a diagram illustrating a configuration of a pointing variation measuring system according to Embodiment 1 of the present disclosure.

A pointing variation measuring system 100 according to an embodiment of the present disclosure is described hereinafter with reference to FIG. 1. The pointing variation measuring system 100 measures an amount of attitude variation (displacement) of a primary minor and an amount of attitude variation (displacement) of a secondary minor to detect an error of an optical axis of a reflective condenser optical system. In the following description, the amount of attitude variation of the primary minor means a deviation of a current attitude from the proper attitude (reference attitude) of the primary minor. The same applies to the amount of variation of the secondary minor.

The pointing variation measuring system 100 measures an amount of variation of an optical axis of a telescope 200, which is an example of the reflective condenser optical system. The amount of variation of the optical axis, or the error of the optical axis, is a magnitude of the deviation of the current position from the proper position of the optical axis. The telescope 200 is a reflective telescope including a primary minor 220 and a secondary minor 230 within a tube 210.

The pointing variation measuring system 100 includes a first laser light source 101, a second laser light source 102, a stabilizing apparatus 110 for stabilizing the laser light sources in inertial space, and an attitude detector unit 120. In FIG. 1, a direction going from right to left in the plane of paper is defined as the +Z-axis direction, a direction going from back to front of the paper perpendicularly to the plane of paper is defined as the +X-axis direction, and a direction resulting from rotation of the +Z-axis 90 degrees clockwise around the X-axis is defined as the +Y-axis direction.

The pointing variation measuring system 100 uses laser light to individually measure amounts of attitude variation of two degrees of freedom including a rotation amount (rotation angle) around the X-axis and a translation amount (translation distance) in the Y-axis direction of the primary minor 220 and the secondary minor 230 disposed in the tube 210 of the telescope 200.

The first laser light source 101 and the second laser light source 102 serving as the laser light output unit each include a collimating lens and output (emit) laser light through the collimating lens. Thus the laser light output by the first laser light source 101 and the second laser light source 102 become collimated light. The first laser light source 101 and the second laser light source 102 are connected to a controller 160, and output laser light as instructed by the controller 160.

The stabilizing apparatus 110 stabilizes in inertial space the attitude (travel direction, angle) of the laser light output by the first laser light source 101 and the second laser light source 102. This stabilization reduces effects of attitude changes (variation) of the first laser light source 101 and the second laser light source 102 on measurements when the amounts of attitude variation of the primary minor 220 and the secondary minor 230 are measured.

Figure 2:
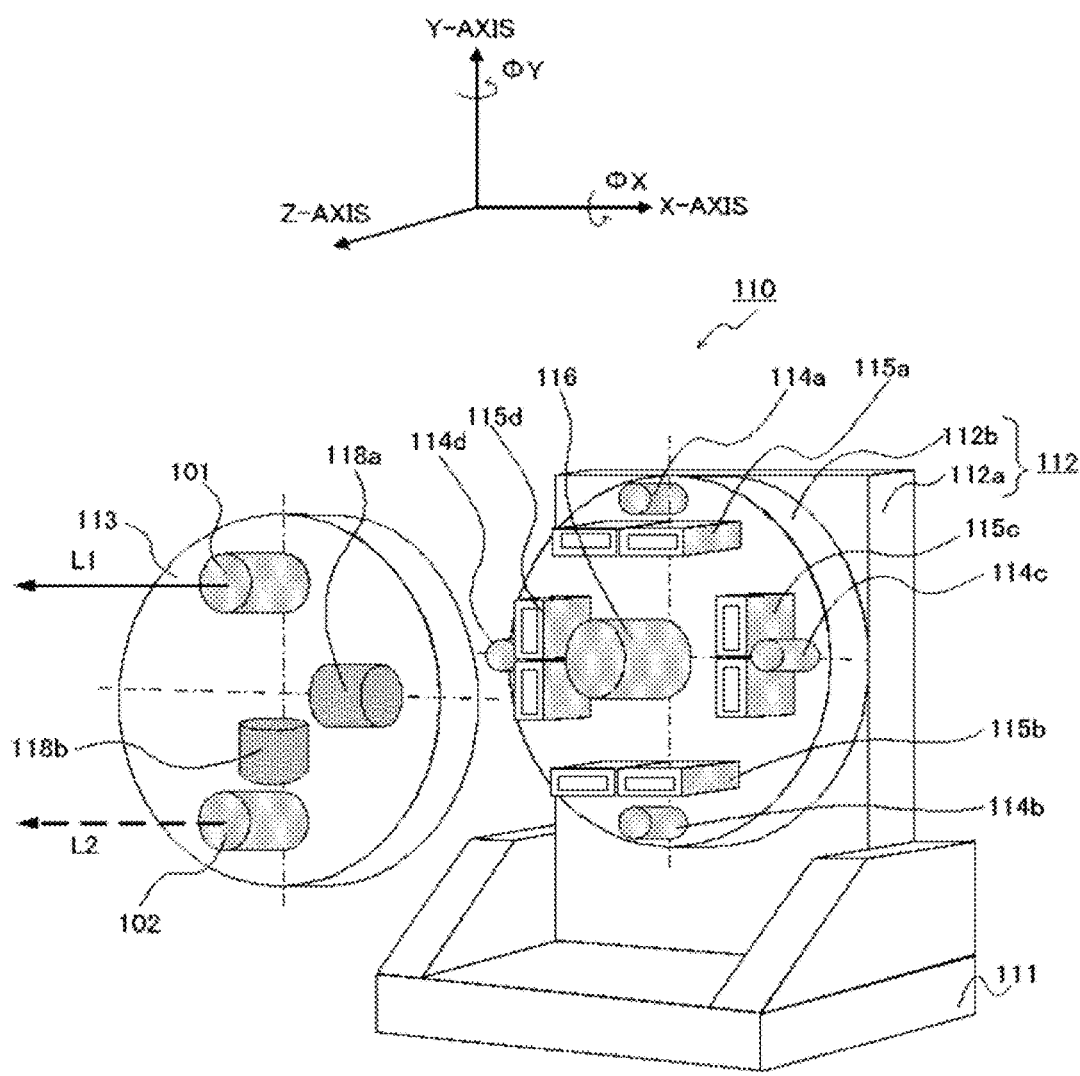
FIG. 2 is an exploded perspective view of a pivoting part and a fixed part of a stabilizing apparatus according to Embodiment 1.

FIG. 2 is an exploded perspective view of the stabilizing apparatus 110. The stabilizing apparatus 110 includes a base 111, a fixed part 112 disposed on the base 111, and a pivoting part 113 disposed to the fixed part 112.

The base 111 is made of metal or the like and supports the entire stabilizing apparatus 110.

The fixed part 112 includes a combination of a rectangular plate 112a and a disk 112b. The rectangular plate 112a is made of metal or the like and is arranged standing on the base 111, and the disk 112b is made of metal.

The pivoting part 113 includes, for example, a disk made of metal. The pivoting part 113 is attached to the fixed part 112 via a two-axis rotation leaf spring 116, and is pivotable around the X-axis and the Y-axis.

Local sensors 114a, 114b, 114c, and 114d (hereinafter sometimes collectively referred to as local sensors 114) are disposed in positions with fourfold symmetry on the disk 112b of the fixed part 112. More specifically, the local sensors 114a and 114b are disposed spaced apart from each other on the Y-axis passing through the center of the disk 112b. The local sensors 114c and 114d are disposed spaced apart from each other on the X-axis passing through the center of the disk 112b. Each local sensor 114 measures a distance between the fixed part 112 and the pivoting part 113, and outputs the measurement to a drive circuit 117. A relative rotation angle of the pivoting part 113 to the fixed part 112 around the X-axis is calculable based on a difference between the measurements of the local sensors 114a and 114b disposed spaced apart from each other in the Y-axis direction. Similarly, a relative rotation angle of the fixed part 112 and the pivoting part 113 around the Y-axis is calculable based on a difference between the measurements of the local sensors 114c and 114d disposed spaced apart from each other in the X-axis direction.

Actuators 115a, 115b, 115c, and 115d (hereinafter sometimes collectively referred to as actuators 115) include linear actuators disposed in positions with fourfold symmetry on the disk of the fixed part 112. The distal end of the individual actuator 115 abuts the rear surface of the pivoting part 113. The drive circuit 117 controls the actuators 115 to individually extend and retract. The extension and retraction of the actuators 115 press the pivoting part 113 from the fixed part 112 side. Inclination of the pivoting part 113 relative to the fixed part 112 is thus adjusted.

Inertial sensors 118 (118a, 118b) are disposed at the pivoting part 113. The inertial sensor 118a measures a rotation angle of the pivoting part 113 around the X-axis and outputs the measurement to the drive circuit 117 as illustrated in FIG. 1. The inertial sensor 118b measures a rotation angle of the pivoting part 113 around the Y-axis and outputs the measurement to the drive circuit 117. The inertial sensors 118a and 118b include an angle sensor, an angular velocity sensor, an acceleration sensor, or the like.

The drive circuit 117 stabilizes the pivoting part 113 in inertial space. Specifically, the drive circuit 117 calculates a relative rotation angle of the pivoting part 113 around the X-axis with respect to the fixed part 112 (an X-axis rotation angle), based on a difference between the measurements of the local sensor 114a and the local sensor 114b. The drive circuit 117 further calculates a relative rotation angle of the pivoting part 113 around the Y-axis with respect to the fixed part 112 (a Y-axis rotation angle), based on a difference between the measurements of the local sensor 114c and the local sensor 114d. The drive circuit 117 calculates control amounts for the actuators 115 to cause the pivoting part 113 to return to the proper attitude (or initial attitude) based on the calculated rotation angles of the pivoting part 113 around the X-axis and Y-axis and the measurements of the inertial sensors 118a and 118b.

The drive circuit 117 converts the calculated control amounts into voltage values to be applied to the actuators 115, and applies the voltage to the actuators 115 to drive the actuators 115 to extend and retract. The drive circuit 117 drives the actuators 115a and 115b for rotation of the pivoting part 113 around the X-axis. The drive circuit 117 drives the actuators 115c and 115d for rotation of the pivoting part 113 around the Y-axis.

The first laser light source 101 and the second laser light source 102 are disposed on a surface of the pivoting part 113 to oppose the telescope 200, as illustrated in FIG. 2. The first laser light source 101 and the second laser light source 102 are symmetrically disposed 180° apart with respect to the Z-axis passing through the center of the disk of the pivoting part 113.

As described above, the attitude of the pivoting part 113 of the stabilizing apparatus 110 is continuously adjusted to be stabilized in inertial space. Thus, for example, if external vibrations are transmitted via the base 111 or the like and the attitude of the pivoting part 113 slightly changes, the local sensors 114 and the inertial sensors 118 detect the change in attitude of the pivoting part 113. The drive circuit 117 determines, based on the outputs of the local sensors 114 and the inertial sensors 118, control amounts for causing the actuators 115 to return the pivoting part 113 to the initial position detected by the local sensors 114. The drive circuit 117 converts the determined control amounts into voltage values to be applied to the actuators 115, and applies the converted voltage to the actuators 115 to drive the actuators 115 to extend and retract. The drive circuit 117 thus adjusts the attitude of the pivoting part 113 to stabilize the pivoting part 113. This adjustment of the attitude of the pivoting part 113 keeps the attitudes of the first laser light source 101 and the second laser light source 102 substantially unchanged even when external vibrations or the like are transmitted to the pivoting part 113. That is, the attitudes of the first laser light source 101 and the second laser light source 102 are controlled to keep the light sources stabilized in inertial space. Thus, the changes in attitude of the pivoting part 113 do not affect the measurements of the pointing variation measuring system 100.

Next, the attitude detector unit 120 is described with reference to FIG. 1. The attitude detector unit 120 includes a first polarizing plate 121, a second polarizing plate 122, a first beam splitter 123, a second beam splitter 124, a reflector 125, a reflector 126, a secondary minor attitude detection minor 127, a first laser light detector 128, a second laser light detector 129, and a first attitude calculator 130, all of which are disposed to oppose an objective of the tube 210 (right side of the telescope 200 as viewed in a direction into the page of FIG. 1). The attitude detector unit 120 further includes a third beam splitter 131, a third polarizing plate 132, a fourth polarizing plate 133, a third laser light detector 134, a fourth laser light detector 135, and a second attitude calculator 136, all of which are disposed to oppose an eyepiece of the tube 210 (left side of the telescope 200 of FIG. 1).

The first polarizing plate 121, which transmits only a p-wave (p-polarized wave), is disposed in a position to oppose a laser light outlet of the first laser light source 101. A second polarizing plate 122, which transmits only an s-wave (s-polarized wave), is disposed in a position to oppose a laser light outlet of the second laser light source 102.

The first beam splitter 123 serving as a laser light splitter unit lies on an optical path of laser light output by the first laser light source 101 and travelling in the +Z-direction, and is located before the tube 210 of the telescope 200. The second beam splitter 124 lies on an optical path of laser light output by the second laser light source 102 and travelling in the +Z-direction, and is located before the tube 210 of the telescope 200.

The secondary minor attitude detection minor 127 is attached to a non-reflective surface of the secondary minor 230. The secondary minor attitude detection minor 127 may be a minor distinct from the secondary minor 230 or a minored surface obtained by applying a coat to a flat portion of the rear surface of the secondary minor 230.

The first beam splitter 123 splits laser light (p-wave) L1, which is output by the first laser light source 101 and passes through the first polarizing plate 121, into two beams of laser light L11 in the +Z-direction and laser light L12 in the −Y direction. Among the split laser light, the laser light L11 that travels in the +Z-direction enters the tube 210. Among the split laser light, the laser light L12 that travels in the −Y direction is reflected by the reflector 125 and becomes incident on the secondary minor attitude detection minor 127.

The second beam splitter 124 splits the s-wave of the laser light L2, which is output by the second laser light source 102 and passes through the second polarizing plate 122, into two beams of laser light L21 in the +Z-direction and laser light L22 in the +Y direction. Among the split laser light, the laser light L21 that travels in the +Z-direction enters the tube 210. Among the split laser light, the laser light L22 that travels in the +Y direction is reflected by the reflector 126 and becomes incident on the secondary minor attitude detection minor 127.

The secondary minor attitude detection minor 127 is attached to a non-reflective surface of the secondary minor 230 at a position not to prevent the telescope 200 from forming images.

The laser light L12 reflected by the reflector 125 and incident on the secondary minor attitude detection minor 127 is then reflected by the secondary minor attitude detection minor 127 and enters the first laser light detector 128. The laser light L22 reflected by the reflector 126 and incident on the secondary minor attitude detection minor 127 is then reflected by the secondary minor attitude detection minor 127 and enters the second laser light detector 129.

The first laser light detector 128 is disposed in a position to oppose a reflective surface of the secondary minor attitude detection minor 127.

The first laser light detector 128 includes a position sensitive detector (PSD) sensor and serves as the first laser light detector unit. The first laser light detector 128 receives laser light L12 reflected by the secondary minor attitude detection minor 127, measures an incident point and an incident angle of the received laser light L12, and outputs the measurements to the first attitude calculator 130.

The second laser light detector 129 is disposed in a position to oppose the reflective surface of the secondary minor attitude detection minor 127.

The second laser light detector 129 includes a PSD sensor. The second laser light detector 129 serves as the first laser light detector unit together with the first laser light detector 128. The second laser light detector 129 receives the laser light L22 reflected by the secondary minor attitude detection minor 127, measures an incident point and an incident angle of the received laser light L22, and outputs the measurements to the first attitude calculator 130.

The first attitude calculator 130 calculates an amount of attitude variation of the secondary minor 230 based on the measurements provided by the first laser light 128 and the second laser light detector 129. Here, the amount of attitude variation of the secondary minor 230 is a deviation of a current attitude of the secondary minor 230 from the proper attitude of the secondary minor 230 (rotation angle around the X-axis and translation distance in the Y-axis direction). The first attitude calculator 130 outputs the calculated amount of attitude variation, for example to the controller 160, and outputs, to the second attitude calculator 136 described below, the outputs of the first laser light detector 128 and the second laser light detector 129. Arithmetic operations performed by the first attitude calculator 130 are described hereinafter in detail.

The third beam splitter 131 is disposed in a position to oppose the eyepiece of the tube 210. The third beam splitter 131 splits (branches), into two beams, the laser light (combination of laser light L11 and L12) reflected by the primary minor 220 and the secondary minor 230 in the tube 210 and passing through the eyepiece.

One beam of laser light split by the third beam splitter 131 passes through the third polarizing plate 132 for allowing transmission of only the p-wave, and then enters the third laser light detector 134. The other beam of laser light split by the third beam splitter 131 passes through the fourth polarizing plate 133 for allowing transmission of only the s-wave, and then enters the fourth laser light detector 135. The third polarizing plate 132 and the fourth polarizing plate 133 enable separation of the beams of laser light, which are combined in the tube 210 after output by the first laser light source 101 and the second laser light source 102. Thus, the third laser light detector 134 and the fourth laser light detector 135 each only receive the corresponding beam of laser light output by either one of the first laser light source 101 and the second laser light source 102.

The third laser light detector 134 includes the PSD sensor and serves as the second laser light detector unit. The third laser light detector 134 measures an incident point and an incident angle of the received laser light, and outputs the measurements to the second attitude calculator 136.

The fourth laser light detector 135 also includes the PSD sensor and serves as the second laser light detector unit. The fourth laser light detector 135 measures an incident point and an incident angle of the received laser light, and outputs the measurements to the second attitude calculator 136.

The outputs of the third laser light detector 134 and the fourth laser light detector 135 are affected both by changes in attitude associated with rotation around the X-axis and translation in the Y-axis direction of the secondary minor 230 and by changes in attitude associated with rotation around the X-axis and translation in the Y-axis direction of the primary minor 220.

The second attitude calculator 136 calculates an amount of attitude variation of the primary minor 220 based on each measurement output by the third laser light detector 134 and the fourth laser light detector 135 and the calculated value output by the first attitude calculator 130. Here, the amount of attitude variation of the primary minor 220 is a deviation of the current attitude of the primary minor 220 from the proper attitude of the primary minor 220. Arithmetical operations performed by the second attitude calculator 136 are described hereinafter in detail.

Such an arrangement provides a path of laser light output by the first laser light source 101 and the second laser light source 102 as follows.

The laser light L1 output by the first laser light source 101 passes through the first polarizing plate 121 to turn into the p-wave, which is split by the first beam splitter 123. One beam of split laser light L11 enters the tube 210 of the telescope 200. The other beam of split laser light L12 is reflected sequentially by the reflector 125 and the secondary minor attitude detection minor 127, and enters the first laser light detector 128.

The laser light L2 output by the second laser light source 102 passes through the second polarizing plate 122 to turn into the s-wave, which is split by the second beam splitter 124. One beam of split laser light L21 travels parallel to the laser light L11 in the +Z-direction, and enters the tube 210 of the telescope 200. The other beam of split laser light L22 is reflected sequentially by the reflector 126 and the secondary minor attitude detection minor 127, and enters the second laser light detector 129.

The beams of laser light L11 and L21 entering the tube 210 are reflected by the primary minor 220 and the secondary minor 230, pass through the eyepiece of the tube 210 to the outside of the tube 210, and are split by the third beam splitter 131. The p-wave component of one beam of the split laser light (that is, the component output by the first laser light source 101), passes through the third polarizing plate 132 and enters the third laser light detector 134. The s-wave component of the other beam of the split laser light (that is, the component output by the second laser light source 102), passes through the fourth polarizing plate 133 and enters the fourth laser light detector 135.

Figure 3:
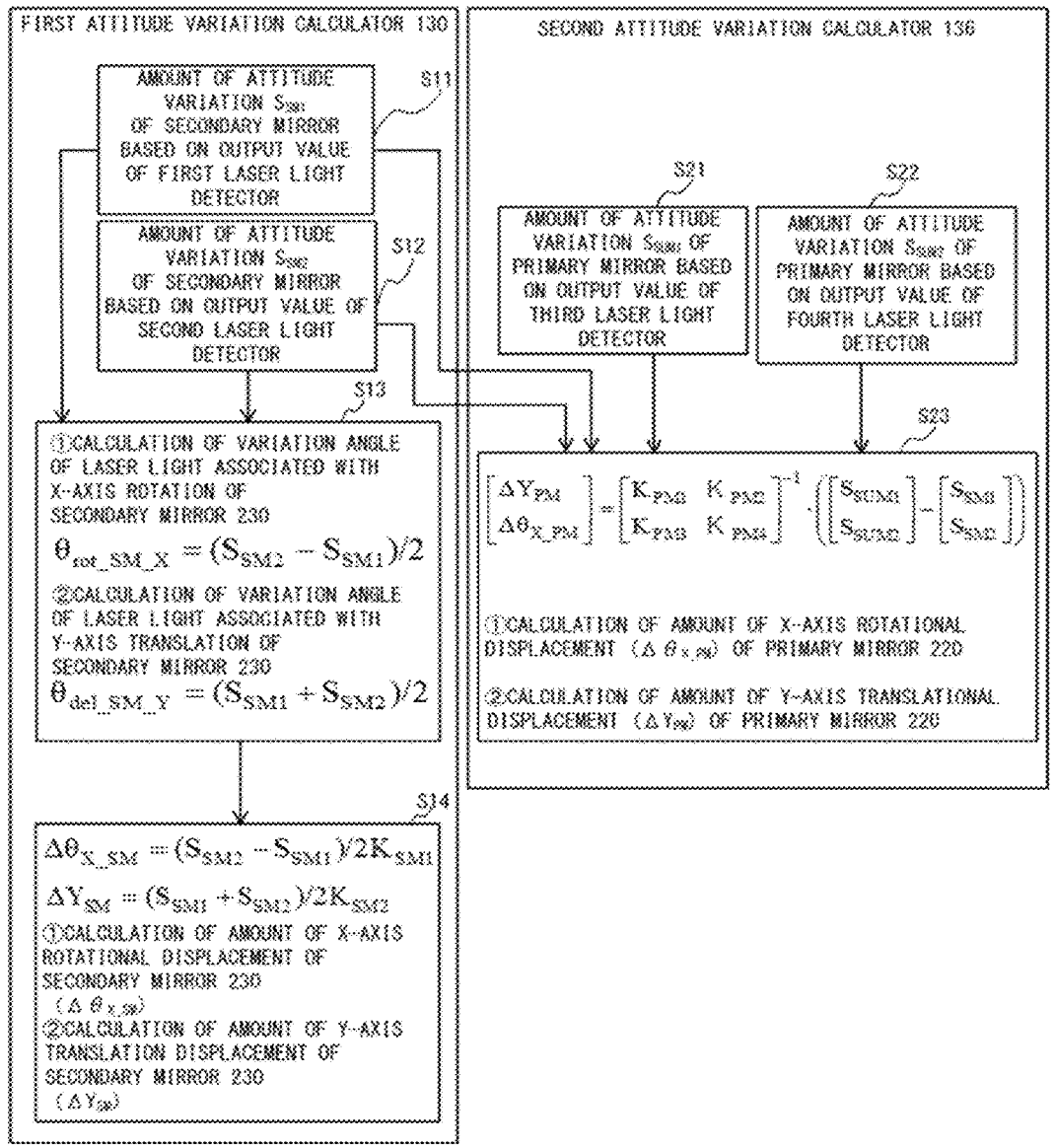
FIG. 3 is a block diagram illustrating calculation by a first attitude calculator and a second attitude calculator according to Embodiment 1.

The following describes, with reference to FIGS. 1 and 3, an operation of the pointing variation measuring system 100 having the above mentioned arrangement to measure an amount of variation of the optical axis of the telescope 200 by separation into a component associated with the primary minor 220 and a component associated with the secondary minor 230.

Firstly, the stabilizing apparatus 110 as illustrated in FIG. 1 is brought into operation and stabilizes the first laser light source 101 and the second laser light source 102 in inertial space. The first laser light source 101 and the second laser light source 102 are turned on to emit beams of laser light L1 and L2 while the stabilizing apparatus 110 operates.

The laser light L1 output by the first laser light source 101 travels through the above mentioned optical path, is reflected by the secondary minor attitude detection minor 127, and enters the first laser light detector 128. The first laser light detector 128 detects an incident point and an incident angle of the received laser light (p-wave), and outputs the detected values to the first attitude calculator 130. Similarly, the laser light L2 output by the second laser light source 102 travels through the above mentioned optical path, is reflected by the secondary minor attitude detection minor 127, and enters the second laser light detector 129. The second laser light detector 129 detects an incident point and an incident angle of the received laser light (s-wave), and outputs the detected values to the first attitude calculator 130.

The first attitude calculator 130 obtains the output values of the first laser light detector 128 and the second laser light detector 129 (steps S11 and S12 in FIG. 3), and calculates a variation angle of the laser light associated with the rotation of the secondary minor 230 around the X-axis and a variation angle of the laser light associated with the translation in the Y-axis direction (steps S13 and S14).

A more detailed description is provided below. The first attitude calculator 130 previously stores, in memory, information of the proper attitude (reference attitude) of the secondary minor 230. Specifically, the information on the proper attitude of the secondary minor 230 is a value obtained by previously measuring (detecting) the initial attitude of the secondary minor 230. The first attitude calculator 130 determines an amount of attitude variation of the secondary minor 230 by subtracting the measurement of the initial attitude of the secondary minor 230 from each of the output values of the first laser light detector 128 and the second laser light detector 129. The amount of attitude variation of the secondary minor 230 determined by subtracting the measurement of the initial attitude of the secondary minor 230 from the output value of the first laser light detector 128 is denoted by $S_{SM1}$. The amount of attitude variation of the secondary minor 230 determined by subtracting the measurement of the initial attitude of the secondary minor 230 from the output value of the second laser light detector 129 is denoted by $S_{SM2}$. If the variation angle (displacement angle) of the laser light associated with the rotation of the secondary minor 230 around the X-axis is denoted by $\theta_{rot\_SM\_X}$ and the variation angle (displacement angle) of the laser light associated with the translation of the secondary minor 230 in the Y-axis direction is denoted by $\theta_{del\_SM\_Y}$, $S_{SM1}$ and $S_{SM2}$ can be expressed in Equations 1 and 2. The first attitude calculator 130 performs the following operations based on the measurement, stored in memory, of the initial attitude of the secondary minor 230 and the output value of the first laser light detector 128 and the output value of the second laser light detector 129.

$$S_{SM1} = -\theta_{rot\_SM\_X} + \theta_{del\_SM\_Y} \quad \text{[Equation 1]}$$

$$S_{SM2} = \theta_{rot\_SM\_X} + \theta_{del\_SM\_Y} \quad \text{[Equation 2]}$$

From Equations 1 and 2, the variation angle $\theta_{rot\_SM\_X}$ of the laser light associated with the rotation of the secondary minor 230 around the X-axis can be expressed in Equation 3.

$$\theta_{rot\_SM\_X} = (S_{SM2} - S_{SM1})/2 \quad \text{[Equation 3]}$$

In addition, from Equations 1 and 2, the variation angle $\theta_{del\_SM\_Y}$ of the laser light associated with the translation of the secondary minor 230 in the Y-axis direction can be expressed in Equation 4.

$$\theta_{del\_SM\_Y} = (S_{SM1} + S_{SM2})/2 \quad \text{[Equation 4]}$$

Here, the amount of rotational displacement (displacement angle) of the secondary minor 230 around the X-axis is denoted by $\Delta\theta_{X\_SM}$, and the amount of translational displacement (displacement distance) of the secondary minor 230 in the Y-axis direction is denoted by $\Delta Y_{SM}$. The variation angle $\theta_{rot\_SM\_X}$ of the laser light associated with rotation of the secondary minor 230 around the X-axis and the variation angle $\theta_{del\_SM\_Y}$ of the laser light associated with translation of the secondary minor 230 in the Y-axis direction can be expressed in Equations 5 and 6.

$$\theta_{rot\_SM\_X} = K_{SM1} \cdot \Delta\theta_{X\_SM} \quad \text{[Equation 5]}$$

$$\theta_{del\_SM\_Y} = K_{SM2} \cdot \Delta Y_{SM} \quad \text{[Equation 6]}$$

Here, $K_{SM1}$ is a sensitivity coefficient of the variation angle $\theta_{rot\_SM\_X}$ of the laser light relative to the rotational displacement of the secondary minor 230 around the X-axis, and $K_{SM2}$ is a sensitivity coefficient of the variation angle $\theta_{del\_SM\_Y}$ of the laser light relative to the amount of translational displacement of the secondary minor 230 in the Y-axis direction. $K_{SM1}$ and $K_{SM2}$ are both known parameters and are previously registered in the first attitude calculator 130.

Transforming Equations 5 and 6 gives the following Equations 7 and 8.

$$\Delta\theta_{X\_SM} = (S_{MS2} - S_{SM1})/2K_{SM1} \quad \text{[Equation 7]}$$

$$\Delta Y_{SM} = (S_{MS1} + S_{SM2})/2K_{SM2} \quad \text{[Equation 8]}$$

The first attitude calculator 130 retrieves the measurement, stored in a storage or the like, of the initial attitude of the secondary minor 230, and determines an amount of attitude variation $S_{SM1}$ of the secondary minor 230, which is a value obtained by subtracting the measurement of the initial attitude of the secondary minor 230 from the output value of the first laser light detector 128. The first attitude calculator 130 performs the calculations of Equations 3 and 7 and Equations 4 and 8 using an amount of attitude variation $S_{SM2}$ of the secondary minor 230, which is a value obtained by subtracting the measurement of the proper attitude (initial attitude) of the secondary minor 230 from the output value of the second laser light detector 129, and determines an amount of rotational displacement $\Delta\theta_{X\_SM}$ of the secondary minor 230 around the X-axis and an amount of translational displacement (hereinafter, amount of Y-axis translational displacement) $\Delta Y_{SM}$ of the secondary minor 230 in the Y-axis direction.

The first attitude calculator 130 outputs, for example to a controller 160, the amount of X-axis rotational displacement $\Delta\theta_{X\_SM}$ of the secondary minor 230 and the amount of Y-axis translational displacement $\Delta Y_{SM}$ of the secondary minor 230. In addition, the first attitude calculator 130 outputs to the second attitude calculator 136 the amount of attitude variation $S_{SM1}$ of the secondary minor 230 determined by the first laser light detector 128 and the amount of the attitude variation $S_{SM2}$ of the secondary minor 230 determined by the second laser light detector 129.

On the other hand, as illustrated in FIG. 1, a portion of the laser light L1 output by the first laser light source 101 travels through the above-mentioned optical path, is reflected by the primary minor 220 and the secondary minor 230, and eventually enters the third laser light detector 134. The third laser light detector 134 detects an incident point and an incident angle of the received laser light, and outputs the detected values to the second attitude calculator 136.

Similarly, a portion of the laser light L2 output by the second laser light source 102 travels through the above-mentioned optical path, is reflected by the primary minor 220 and the secondary minor 230, and eventually enters the fourth laser light detector 135. The fourth laser light detector 135 detects an incident point and an incident angle of the received laser light, and outputs the detected values to the second attitude calculator 136.

An amount of attitude variation of the primary minor 220 determined by subtracting the proper attitude (initial attitude) of the primary minor 220 from the output value of the third laser light detector 134 is denoted by $S_{sum1}$. An amount of attitude variation of the primary minor 220 determined by subtracting the proper attitude of the primary minor 220 from the output value of the third laser light detector 134 is denoted by $S_{sum2}$. The amount of X-axis rotational displacement (displacement angle) of the primary minor 220 is denoted by $\Delta\theta_{X\_PM}$, and the amount of translational displacement of the primary minor in the Y-axis direction (hereinafter, amount of Y-axis translational displacement) is denoted by $\Delta Y_{PM}$. The output $S_{sum1}$ of the third laser light detector 134 and the output $S_{sum2}$ of the fourth laser light detector 135 can be expressed in Equation 9. Here, it is assumed that the information regarding the proper attitude of the primary minor 220 is a value obtained by previously measuring (detecting) the initial attitude of the primary minor 220 and that the measurement is stored in storage or the like. The second attitude calculator 136 performs the following operations based on the measurement, stored in storage of the like, of the initial attitude of the primary minor 220 and the output value of the first laser light detector 128 and the output value of the second laser light detector 129.

$$\begin{bmatrix} S_{SUM1} \\ S_{SUM2} \end{bmatrix} = \begin{bmatrix} K_{PM1} & K_{PM2} \\ K_{PM3} & K_{PM4} \end{bmatrix} \cdot \begin{bmatrix} \Delta Y_{PM} \\ \Delta \theta_{X\_PM} \end{bmatrix} + \begin{bmatrix} S_{SM1} \\ S_{SM2} \end{bmatrix} \quad \text{[Equation 9]}$$

Here, $K_{PM1}$ is a sensitivity coefficient of a variation angle (displacement angle) of the laser light L11 relative to an amount of translational displacement $\Delta Y_{PM}$ of the primary minor 220 in the Y-axis direction, whereas $K_{PM2}$ is a sensitivity coefficient of a variation angle of the laser light L11 relative to an amount of X-axis rotational displacement $\Delta \theta_{X\_PM}$ of the primary minor 220. $K_{PM3}$ is a sensitivity coefficient of a variation angle of the laser light L21 relative to an amount of Y-axis translational displacement $\Delta Y_{PM}$ of the primary minor 220, whereas $K_{PM4}$ is a sensitivity coefficient of a variation angle of the laser light L22 relative to an amount of X-axis rotational displacement $\Delta \theta_{X\_PM}$ of the primary minor 220. These four sensitivity coefficients are known optical parameters regarding the telescope 200 and are previously registered in the second attitude calculator 136.

Transforming Equation 9 gives the following Equation 10. Equation 10 shows that the amount of X-axis rotational displacement $\Delta \theta_{X\_PM}$ of the primary minor 220 and the amount of Y-axis translational displacement $\Delta Y_{PM}$ of the primary minor 220 can be obtained by use of $S_{sum1}$ and $S_{sum2}$ and by use of $S_{SM1}$ and $S_{SM2}$.

$$\begin{bmatrix} \Delta Y_{PM} \\ \Delta \theta_{X\_PM} \end{bmatrix} = \begin{bmatrix} K_{PM1} & K_{PM2} \\ K_{PM3} & K_{PM4} \end{bmatrix}^{-1} \cdot \left( \begin{bmatrix} S_{SUM1} \\ S_{SUM2} \end{bmatrix} - \begin{bmatrix} S_{SM1} \\ S_{SM2} \end{bmatrix} \right) \quad \text{[Equation 10]}$$

The second attitude calculator 136 retrieves the measurements of the initial attitudes, stored in the storage or the like, of the primary minor 220 and the secondary minor 230, and determines the amount of attitude variation $S_{sum1}$ of the primary minor 220, which is a value obtained by subtracting the measurement of the proper attitude (initial attitude) of the primary minor 220 from the output value of the third laser light detector 134. The second attitude calculator 136 determines the amount of attitude variation $S_{sum2}$, which is a value obtained by subtracting the measurement of the proper attitude (initial attitude) of the primary minor 220 from the output value of the fourth laser light detector 135 (steps S21 and S22). The second attitude calculator 136 determines the amount of X-axis rotational displacement $\Delta \theta_{X\_PM}$ of the primary minor 220 and the amount of Y-axis translational displacement $\Delta Y_{PM}$ of the primary minor 220 by performing the calculation of Equation 10 using the determined amounts of attitude variation $S_{sum1}$ and $S_{sum2}$ of the primary minor 220 and the amount of attitude variation $S_{SM1}$ and $S_{SM2}$ of the secondary minor 230 provided by the first attitude calculator 130 (step S23).

The pointing variation measuring system 100 thus measures a component, associated with the primary minor 220, of the amount of variation of the optical axis of the telescope 200 through the second attitude calculator 136, and measures a component, associated with the secondary minor 230, of the amount of variation of the optical axis of the telescope 200 through the first attitude calculator 130.

The first attitude calculator 130 and the second attitude calculator 136 output, for example, to the controller 160, the amounts of displacement determined by the calculations, including the amount of X-axis rotational displacement $\Delta \theta_{X\_SM}$ of the secondary minor 230 and the amount of Y-axis translational displacement $\Delta Y_{SM}$ of the secondary minor 230, and the amount of X-axis rotational displacement $\Delta \theta_{X\_PM}$ of the primary minor 220 and the amount of Y-axis translational displacement $\Delta Y_{PM}$ of the primary minor 220. The controller 160, for example, controls the actuators 115 for supporting the primary minor 220 and/or the secondary minor 230 through the drive circuit 117 to control the positions and inclinations, if desired.

As described above, the attitudes of the primary minor 220 and the secondary minor 230 are detected (measured) using two beams of laser light, and the first attitude calculator 130 and the second attitude calculator 136 perform the arithmetic operations. This enables calculation of the amount of X-axis rotational displacement $\Delta \theta_{X\_SM}$ and the amount of Y-axis translational displacement $\Delta Y_{SM}$ of the secondary minor 230, and the amount of X-axis rotational displacement $\Delta \theta_{X\_PM}$ and the amount of Y-axis translational displacement $\Delta Y_{PM}$ of the primary minor 220. That is, the rotation amount around the X-axis and the amount of translational displacement in the Y-axis direction are determined for each of the primary minor 220 and the secondary minor 230.

The stabilizing apparatus 110 allows the stable measurement of deviation of the optical axis without being affected by externally propagating vibrations or the like.

The above-mentioned embodiment has been described as an example of using measured values for each initial attitude as information of the proper attitude of the primary minor 220 and the secondary minor 230. However, other information may be used for the proper attitude of the primary minor 220 and the secondary minor 230. For example, desired attitudes for the primary minor 220 and the secondary minor 230 may be previously determined through calculation or the like, and the information may be prestored in storage or the like.

Embodiment 2

In Embodiment 1 above, measurement of amounts of attitude variation of rotation around the X-axis and translation in the Y-axis direction is exemplified using two laser light sources (first laser light source 101 and second laser light source 102) spaced apart from each other in the Y-axis direction, but the number of the targets to be measured may be increased.

The following describes embodiments of a pointing variation measuring system for measuring an amount of attitude variation associated with rotation around a Y-axis and translation in an X-axis direction obtained by providing two additional laser light sources spaced apart from each other in the X-axis direction.

Figure 4:
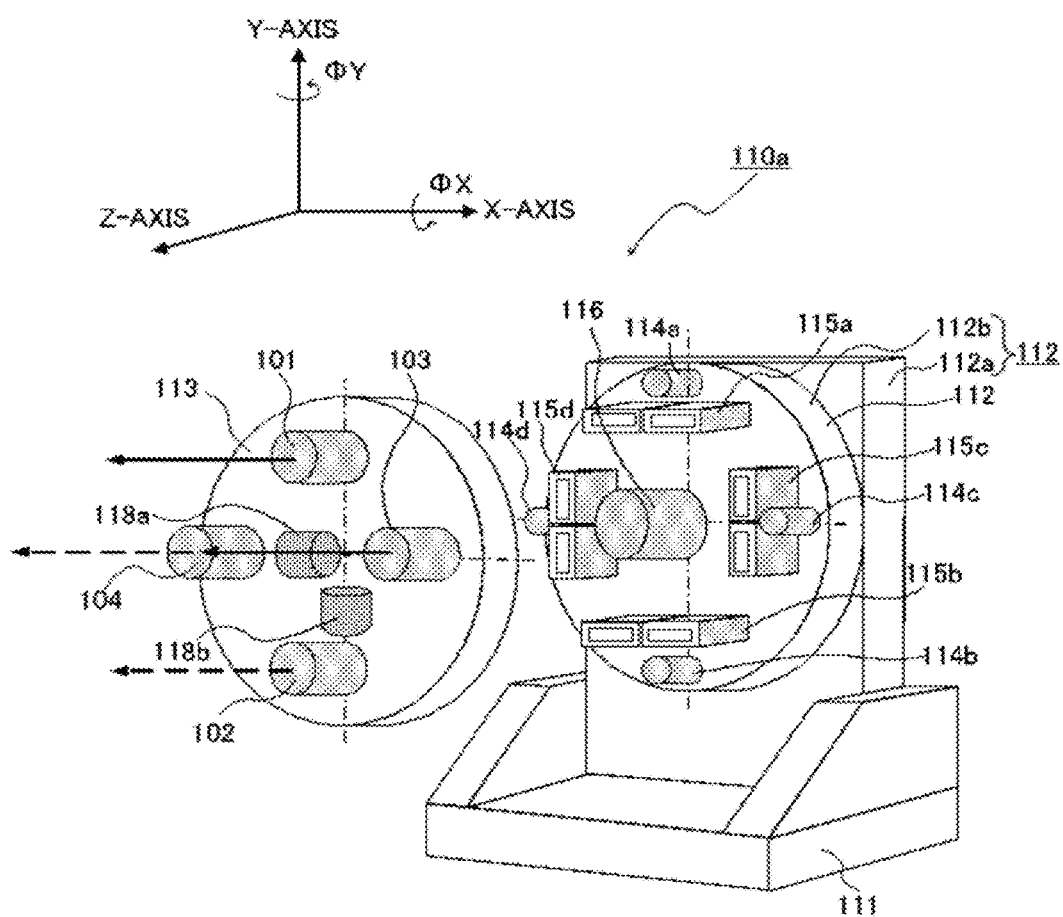
FIG. 4 is an exploded perspective view of a pivoting part and a fixed part of a stabilizing apparatus according to Embodiment 2 of the present disclosure.

FIG. 4 illustrates an exploded perspective view of a stabilizing apparatus 110a according to Embodiment 2. In FIG. 4, like reference numerals identify the same or similar elements in Embodiment 1 above. In Embodiment 2, the stabilizing apparatus 110a is used instead of the stabilizing apparatus 110 of the pointing variation measuring system 100 illustrated in FIG. 1.

The stabilizing apparatus 110a as illustrated in FIG. 4 includes a first laser light source 101, a second laser light source 102, a third laser light source 103, and a fourth laser light source 104. The arrangement of the first laser light source 101 and the second laser light source 102 is similar to that in Embodiment 1. The third laser light source 103 and the fourth laser light source 104 are disposed on the X-axis passing through the center of a disk. The first laser light source 101, the second laser light source 102, the third laser light source 103, and the fourth laser light source 104 are symmetrically disposed 90° apart with respect to an axis in the Z-axis direction passing through the center of the disk.

In this embodiment, an attitude detector unit 120 as illustrated in FIG. 1 includes a first polarizing plate 121, a second polarizing plate 122, and two additional polarizing plates. That is, the polarizing plates are disposed in respective positions to oppose laser light outlets of the additional third laser light source 103 and fourth laser light source 104. One polarizing plate of the additional two polarizing plates transmits only p-wave, whereas the other transmits only s-wave.

In this embodiment, two beam splitters, two reflectors, and two laser light detectors are additionally provided in positions to oppose an objective of a tube 210 with the addition of laser light sources. That is, four polarizing plates and four laser light detectors are provided at the objective side of the tube 210.

A third beam splitter 131 disposed in a position to oppose an eyepiece of the tube 210 as illustrated in FIG. 1 splits, into four beams, laser light reflected by the primary minor 220 and the secondary minor 230 in the tube 210 and passing through the eyepiece.

Two polarizing plates and two laser light detectors are additionally provided in position to oppose the eyepiece of the tube 210 with the addition of the laser light sources. That is, four polarizing plates and fourth laser light detectors are provided at the eyepiece side of the tube 210. One of the additional two polarizing plate transmits only s-wave, whereas the other transmits only p-wave.

The laser light in the present embodiment travels as follows.

Beams of laser light output by the four laser light sources each pass through the corresponding polarizing plates and are split by the corresponding beam splitters. One of the beams of split laser light is reflected by the corresponding reflector and a secondary minor attitude detection minor 127 and enters the corresponding laser light detector. The other of the beams of split laser light enters the tube 210 of the telescope 200.

The beams of laser light after entering the tube 210 are reflected by the primary minor 220 and the secondary minor 230, pass through the eyepiece of the tube 210, and are split into four by the third beam splitter 131 outside the tube 210. The split beams of laser light each pass through the corresponding polarizing plate and enter the corresponding laser light detector.

In Embodiment 2, the first attitude calculator 130 calculates an amount of attitude variation of the secondary minor 230 based on measurements (incident point and incident angle of laser light) each measured by the four laser light detectors.

Arithmetic operations performed by the first attitude calculator 130 to determine the amount of attitude variation of the secondary minor 230 are described.

The values obtained by subtracting the proper attitude (initial attitude) of the secondary minor 230 from the output values of the four laser light detectors are denoted by $S_{SM1}$, $S_{SM2}$, $S_{SM3}$, and $S_{SM4}$. Variation angles (displacement angles) of the laser light associated with rotation of the secondary minor 230 around the X-axis and Y-axis are each denoted by $\theta_{rot\_SM\_X}$ and $\theta_{rot\_SM\_Y}$, and variation angles (displacement angles) of laser light associated with translation of the secondary minor 230 in the X-axis and Y-axis directions are each denoted by $\theta_{del\_SM\_X}$ and $\theta_{del\_SM\_Y}$. Here, $S_{SM1}$ to $S_{SM4}$ can be expressed as follows.

$$\begin{cases} S_{SM1} = -\theta_{rot\_SM\_X} + \theta_{del\_SM\_Y} \\ S_{SM2} = \theta_{rot\_SM\_X} + \theta_{del\_SM\_Y} \\ S_{SM3} = -\theta_{rot\_SM\_Y} + \theta_{del\_SM\_X} \\ S_{SM4} = \theta_{rot\_SM\_Y} + \theta_{del\_SM\_X} \end{cases} \quad \text{[Equation 11]}$$

From Equation 11, $\theta_{rot\_SM\_X}$, $\theta_{rot\_SM\_Y}$, $\theta_{del\_SM\_X}$, and $\theta_{del\_SM\_Y}$ can be expressed as follows.

$$\begin{cases} \theta_{rot\_SM\_X} = (S_{SM2} - S_{SM1})/2 \\ \theta_{rot\_SM\_Y} = (S_{SM4} - S_{SM3})/2 \\ \theta_{del\_SM\_X} = (S_{SM3} + S_{SM4})/2 \\ \theta_{del\_SM\_Y} = (S_{SM1} + S_{SM2})/2 \end{cases} \quad \text{[Equation 12]}$$

Here, the amounts of X-axis and Y-axis rotational displacement of the secondary minor 230 are denoted respectively as $\Delta\theta_{X\_SM}$ and $\Delta\theta_{Y\_SM}$, and the amounts of X-axis and Y-axis translational displacement of the secondary minor 230 are denoted respectively as $\Delta X_{SM}$ and $\Delta Y_{SM}$. A sensitivity coefficient of the variation angle $\theta_{rot\_SM\_X}$ of laser light relative to the X-axis rotational displacement of the secondary minor 230 is denoted by $K_{SM1}$, a sensitivity coefficient of the variation angle $\theta_{rot\_SM\_Y}$ of laser light relative to the Y-axis rotational displacement of the secondary minor 230 is denoted by $K_{SM3}$, a sensitivity coefficient of the variation angle $\theta_{del\_SM\_X}$ of laser light relative to the X-axis translational displacement is denoted by $K_{SM4}$, and a sensitivity coefficient of the variation angle $\theta_{del\_SM\_Y}$ of laser light relative to the Y-axis translational displacement is denoted by $K_{SM2}$. $\theta_{rot\_SM\_X}$, $\theta_{rot\_SM\_Y}$, $\theta_{del\_SM\_X}$, and $\theta_{del\_SM\_Y}$ can be expressed as in the following Equation 13.

$$\begin{cases} \theta_{rot\_SM\_X} = K_{SM1} \cdot \Delta\theta_{X\_SM} \\ \theta_{rot\_SM\_Y} = K_{SM3} \cdot \Delta\theta_{Y\_SM} \\ \theta_{del\_SM\_X} = K_{SM4} \cdot \Delta X_{SM} \\ \theta_{del\_SM\_Y} = K_{SM2} \cdot \Delta Y_{SM} \end{cases} \quad \text{[Equation 13]}$$

Transforming Equation 13 gives the following Equation 14.

$\Delta\theta_{X\_SM} = 1/K_{SM1} \cdot ((S_{SM2} - S_{SM1})/2)$ $\Delta\theta_{Y\_SM} = 1/K_{SM3} \cdot ((S_{SM4} - S_{SM3})/2)$ $\Delta X_{SM} = 1/K_{SM4} \cdot ((S_{SM3} + S_{SM4})/2)$ $\Delta Y_{SM} = 1/K_{SM2} \cdot ((S_{SM1} + S_{SM2})/2)$ [Equation 14]

The first attitude calculator 130 performs the calculations of Equations 12 and 14 using output values of the four laser light detectors, amounts of attitude variation ($S_{SM1}$, $S_{SM2}$, $S_{SM3}$, $S_{SM4}$) of the secondary minor 230 obtained from the output values of the four laser light detectors, and sensitivity coefficients ($K_{SM1}$, $K_{SM2}$, $K_{SM3}$, $K_{SM4}$). The first attitude calculator 130 thus determines the amount of X-axis rotational displacement $\Delta\theta_{X\_SM}$ of the secondary minor 230, the amount of Y-axis translational displacement $\Delta Y_{SM}$ of the secondary minor 230, the amount of X-axis translational displacement $\Delta X_{SM}$ of the secondary minor 230, and the amount of Y-axis rotational displacement $\Delta\theta_{Y\_SM}$ of the secondary minor 230.

The first attitude calculator 130 outputs the calculated value to the controller 160. The first attitude calculator 130 also outputs the determined amounts of attitude variation ($S_{SM1}$, $S_{SM2}$, $S_{SM3}$, $S_{SM4}$) of the secondary minor 230 to the second attitude calculator 136.

On the other hand, the second attitude calculator 136 calculates an amount of attitude variation of the primary minor 220 based on the measurement each measured by the four laser light detectors for light reflected on the primary minor 220 and the secondary minor 230 in the tube 210.

The amounts of rotational displacement of the primary minor 220 around the X-axis and the Y-axis are denoted respectively by $\Delta\theta_{X\_PM}$ and $\Delta\theta_{Y\_PM}$, and the amounts of translational displacement of the primary minor 220 on the X-axis and the Y-axis are denoted respectively by $\Delta X_{PM}$ and $\Delta Y_{PM}$. The amounts of attitude variation $S_{sum1}$–$S_{sum4}$ of the primary minor 220 obtained from the output values of the four laser light detectors can be expressed as follows.

$$\begin{bmatrix} S_{SUM1} \\ S_{SUM2} \\ S_{SUM3} \\ S_{SUM4} \end{bmatrix} = \begin{bmatrix} 0 & K'_{PM1} & K'_{PM2} & 0 \\ 0 & K'_{PM3} & K'_{PM4} & 0 \\ K'_{PM5} & 0 & 0 & K'_{PM6} \\ K'_{PM7} & 0 & 0 & K'_{PM8} \end{bmatrix} \begin{bmatrix} \Delta X_{PM} \\ \Delta Y_{PM} \\ \Delta\theta_{X\_PM} \\ \Delta\theta_{Y\_PM} \end{bmatrix} + \begin{bmatrix} S_{SM1} \\ S_{SM2} \\ S_{SM3} \\ S_{SM4} \end{bmatrix}$$

[Equation 15]

Here, each sensitivity coefficient of $K'_{PM1}$–$K'_{PM8}$ is a known optical parameter. Transforming Equation 15 gives the following Equation 16.

$$\begin{bmatrix} \Delta X_{PM} \\ \Delta Y_{PM} \\ \Delta\theta_{X\_PM} \\ \Delta\theta_{Y\_PM} \end{bmatrix} = \begin{bmatrix} 0 & K'_{PM1} & K'_{PM2} & 0 \\ 0 & K'_{PM3} & K'_{PM4} & 0 \\ K'_{PM5} & 0 & 0 & K'_{PM6} \\ K'_{PM7} & 0 & 0 & K'_{PM8} \end{bmatrix}^{-1} \left( \begin{bmatrix} S_{SM1} \\ S_{SM2} \\ S_{SM3} \\ S_{SM4} \end{bmatrix} - \begin{bmatrix} S_{SM1} \\ S_{SM2} \\ S_{SM3} \\ S_{SM4} \end{bmatrix} \right)$$

[Equation 16]

The second attitude calculator 136 performs the calculation of Equation 16 using $S_{sum1}$–$S_{sum4}$, which are the amounts of attitude variation of the primary minor 220 obtained from the output values of the four laser light detectors. The second attitude calculator 136 thus calculates amounts of rotational displacement $\Delta\theta_{X\_PM}$ and $\Delta\theta_{Y\_M}$ of the primary minor 220 around the X-axis and the Y-axis, respectively, and amounts of translational displacement $\Delta X_{PM}$ and $\Delta Y_{PM}$ of the primary minor 220 of the X-axis and the Y-axis, respectively. The second attitude calculator 136 outputs the calculated values to the controller 160.

In Embodiment 1, the amounts of attitude variation of the primary minor 220 and the secondary minor 230 are calculated based on the amounts of the X-axis rotation displacement and the amounts of Y-axis translational displacement of each of the primary minor 220 and the secondary minor 230. However, in Embodiment 2, the amounts of attitude variation of the primary minor 220 and the secondary minor 230 associated with the X-axis and Y-axis rotation and the X-axis and Y-axis translation of each of the primary minor 220 and the secondary minor 230 are calculated using the four laser light sources. In other words, Embodiment 2 enables the amount of variation of the optical axis to be calculated more precisely.

Embodiment 3

Calculation of an amount of variation of an optical axis similarly as in Embodiment 1 above is enabled even when using only a single light source.

Figure 5:
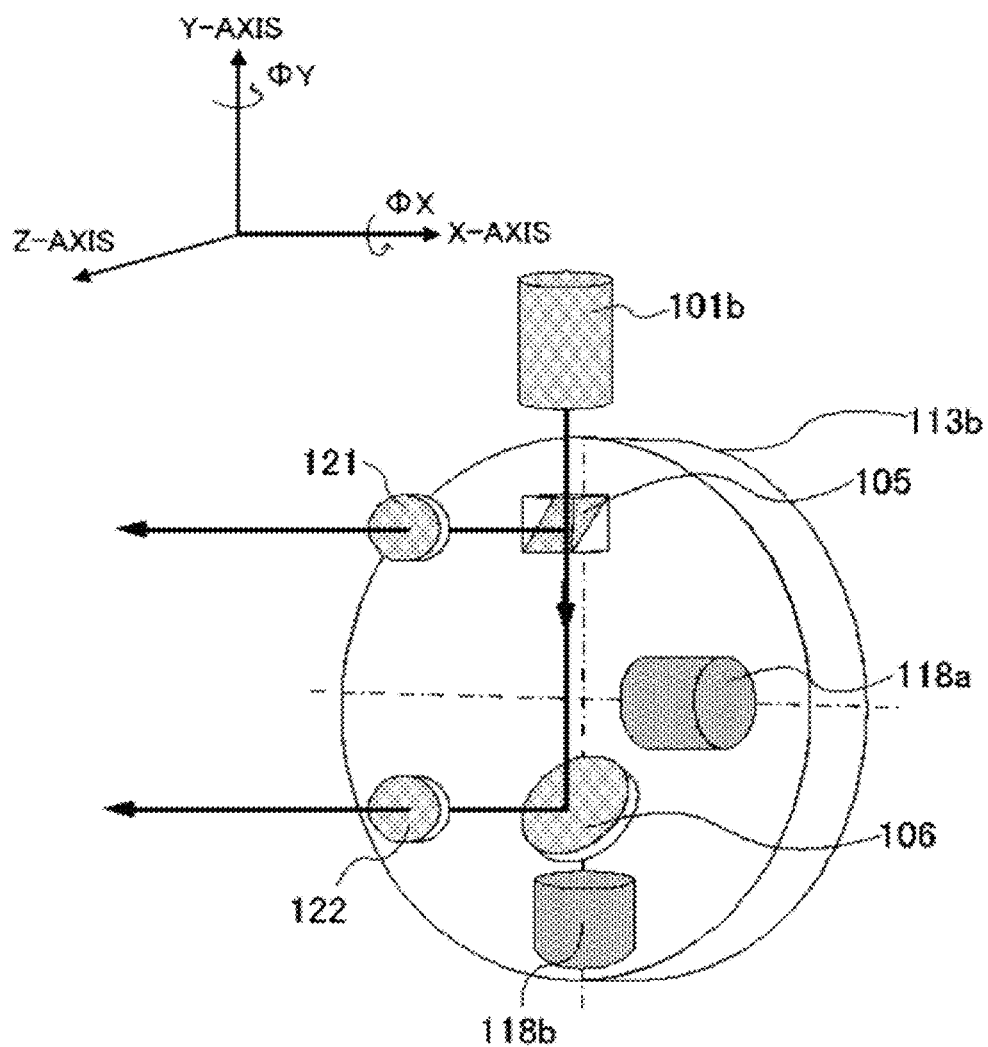
FIG. 5 is a perspective view of a pivoting part of a stabilizing apparatus according to Embodiment 3 of the present disclosure.
Figure 6:
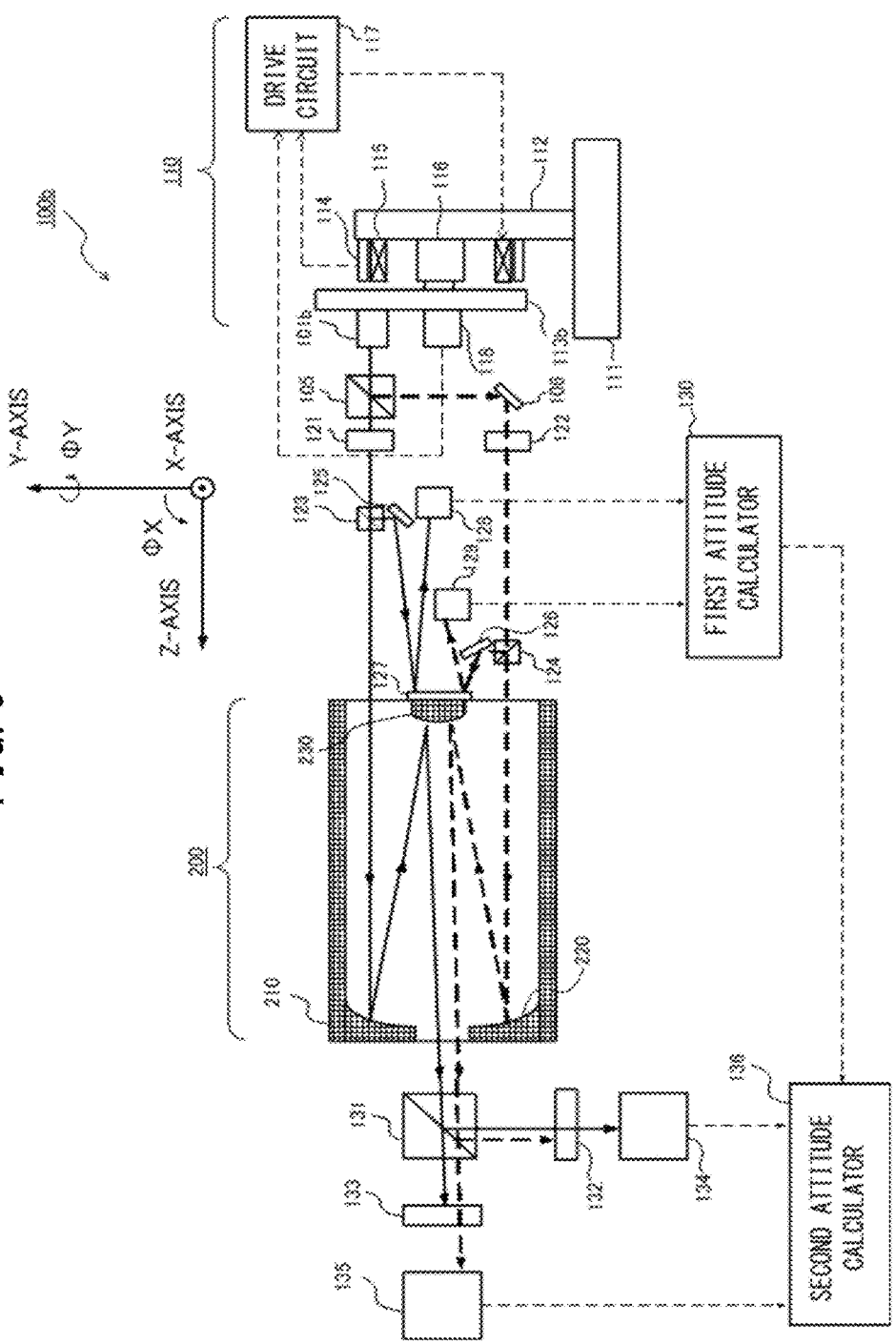
FIG. 6 is a diagram illustrating a configuration of a pointing variation measuring system according to Embodiment 3.

FIG. 5 illustrates a perspective view of a pivoting part 113b of a stabilizing apparatus according to Embodiment 3. FIG. 6 illustrates a configuration of a pointing variation measuring system 100b employing the pivoting part 113b. The configuration other than the pivoting part 113b is similar to that of Embodiment 1.

As illustrated in FIG. 5, a single laser light source 101b is used in Embodiment 3. A beam splitter 105 and a reflector 106 are disposed on a surface of the pivoting part 113b. Unlike Embodiment 1, the laser light source 101b is disposed in a position to enable the output laser light to enter the beam splitter 105 disposed on the surface of the pivoting part 113b.

Laser light output by the laser light source 101b is divided into two beams by the beam splitter 105. One beam of the split laser light, as illustrated in FIG. 6, travels on a path similar to the laser light output by the first laser light source 101 of Embodiment 1. The other beam of the split laser light travels a path similar to that of the laser light output by the second laser light source 102 of Embodiment 1.

This use of the single laser light source provides a similar configuration to that with the two laser light sources as in Embodiment 1. Fewer laser light sources result in a lighter-weight stabilizing apparatus 110.

When multiple laser light sources are used, differences in the influences of laser fluctuations among the attitude detectors occur due to variations in the laser fluctuations of each of the laser light sources. However, use of a single laser light source enables the influences of the laser fluctuations on the measurement system to be made uniform among the attitude detectors. This thus enables highly precise calculation of the amount of attitude variation of the primary minor 220 and the secondary minor 230.

Embodiment 4

Although the configuration of using four laser light sources is described in Embodiment 2, the similar configuration can be provided using two laser light sources.

Figure 7:
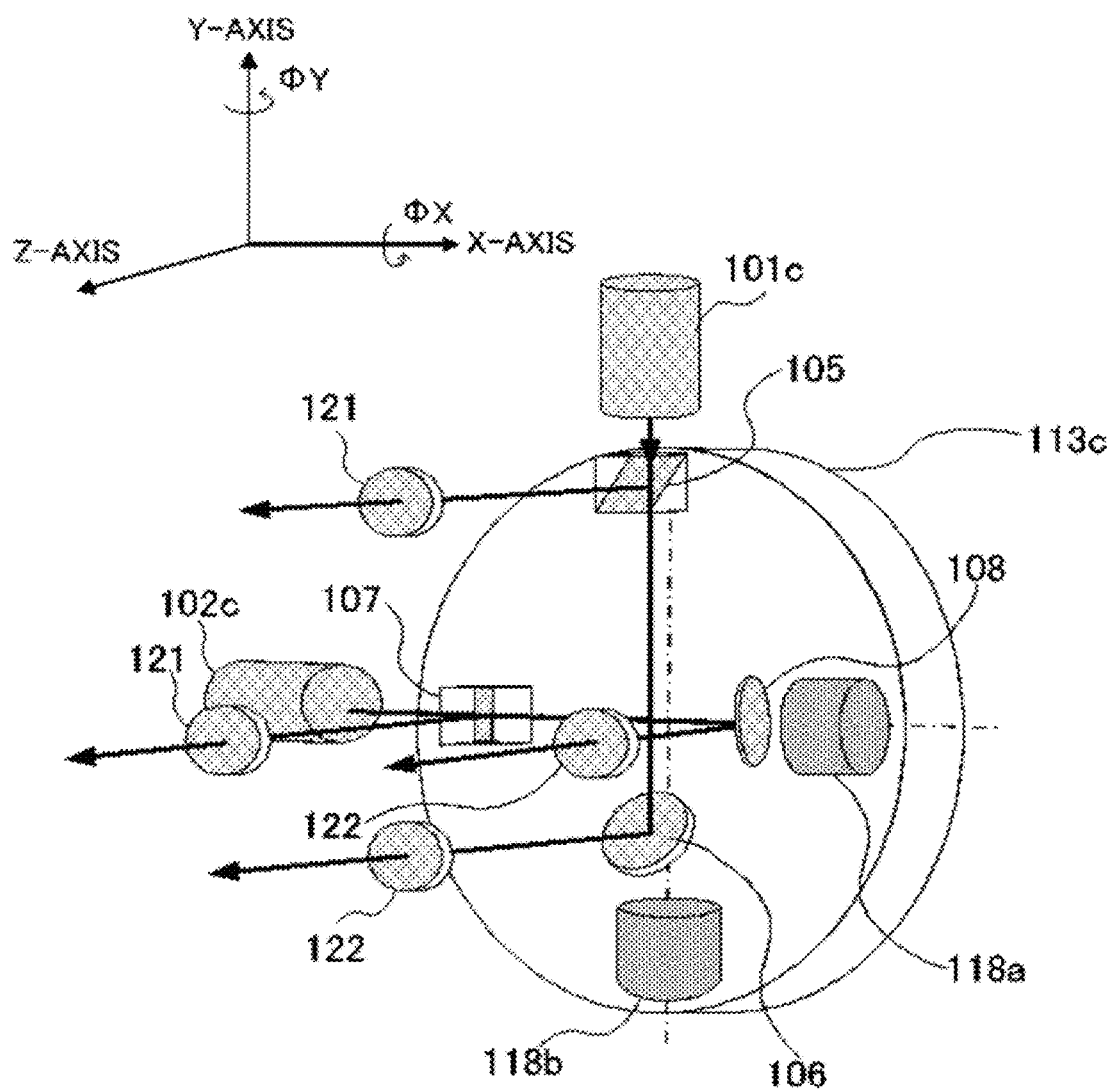
FIG. 7 is a perspective view of a pivoting part of a stabilizing apparatus according to Embodiment 4 of the present disclosure.

FIG. 7 illustrates a perspective view of a pivoting part 113c of the stabilizing apparatus 110 of Embodiment 4. The configuration other than the pivoting part 113c is similar to that of Embodiment 2.

Two laser light sources 101c and 102c are used in Embodiment 4. On a surface of the pivoting part 113c are provided a beam splitter 105 and a reflector 106 both for splitting laser light output by the laser light source 101c, and a beam splitter 107 and a reflector 108 both for splitting laser output by the laser light source 102c. The laser light sources 101c and 102c are disposed in positions to enable the output laser light to enter the corresponding beam splitters 105 and 107.

The laser light output by the laser light source 101c is split into two beams by the beam splitter 105. One beam of the split laser light travels on a path similar to that of the laser light output by the first laser light source 101 of Embodiment 1. The other beam of the split laser light travels on a path similar to that of the laser light output by the second laser light source 102 of Embodiment 1.

The laser light output by the laser light source 102c is split into two beam paths by the beam splitter 107. One beam of the split laser light travels on a path similar to that of the laser light output by the first laser light source 101 of Embodiment 2. The other beam of the split laser light travels on a path similar to that of the laser light output by the second laser light source 102 of Embodiment 2.

This use of the two laser light sources provides a similar configuration to that with the four laser light sources as in Embodiment 2. Fewer laser light sources result in a lighter-weight stabilizing apparatus 110.

Use of multiple laser light sources may cause different influences of laser fluctuations among the attitude detectors due to variations in the laser fluctuations of each of the laser light sources. However, use of a single laser light source enables influences of the laser fluctuations on a measurement system to be made uniform among the attitude detectors. This thus enables highly precise calculation of the amount of attitude variation of the primary minor 220 and the secondary minor 230.

Embodiment 5

In Embodiment 1, the first laser light detector 128 and the second laser light detector 129 are provided to detect an amount of attitude variation of a secondary minor 230 as illustrated in FIG. 1. However, these detectors may be replaced by a single detector.

Figure 8:
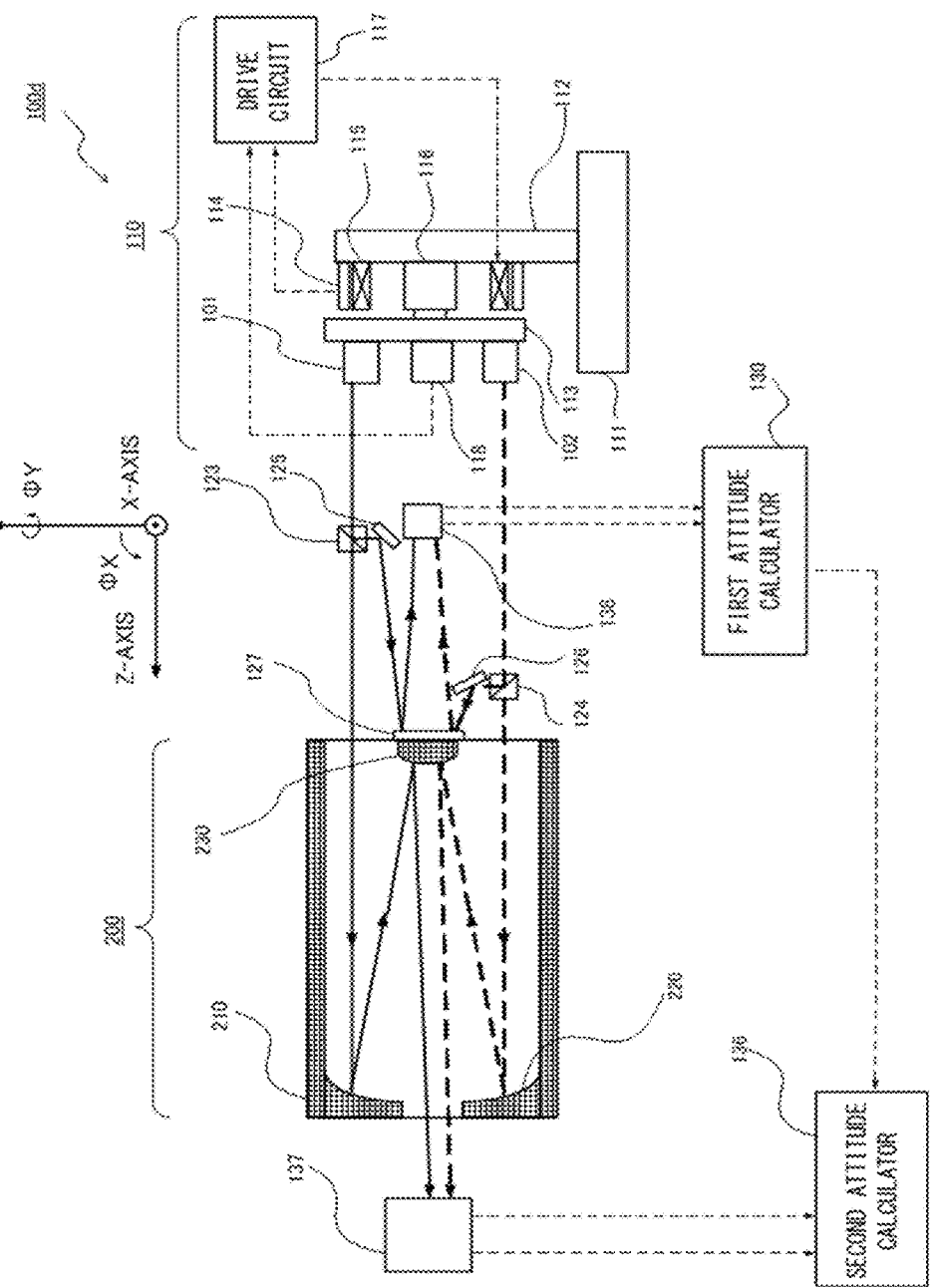
FIG. 8 is a diagram illustrating a configuration of a pointing variation measuring system according to Embodiment 5 of the present disclosure.

FIG. 8 illustrates a configuration of a pointing variation measuring system 100d according to Embodiment 5. Here, a laser light detector 138 is provided instead of the first laser light detector 128 and the second laser light detector 129. The laser light detector 138 is a charge coupled device (CCD) or complementary metal oxide semiconductor (CMOS) detection sensor. Use of the laser light detector 138 enables determination of a position of the center of gravity of the laser spot light and simultaneous detection (measurement) of two beams of laser light.

In Embodiment 1, the third beam splitter 131, the third laser light detector 134, the fourth laser light detector 135, and the like are disposed in positions to oppose the eyepiece of the tube 210. However, these elements may be replaced with a laser light detector 137 that is a CCD or CMOS detection sensor.

The reduced number of detectors simplifies the configuration of the pointing variation measuring system.

Embodiment 6

A configuration of producing multiple beams of laser light with a single laser light source as in Embodiment 3 may be combined with a configuration of the reduced number of detectors as in Embodiment 5.

Figure 9:
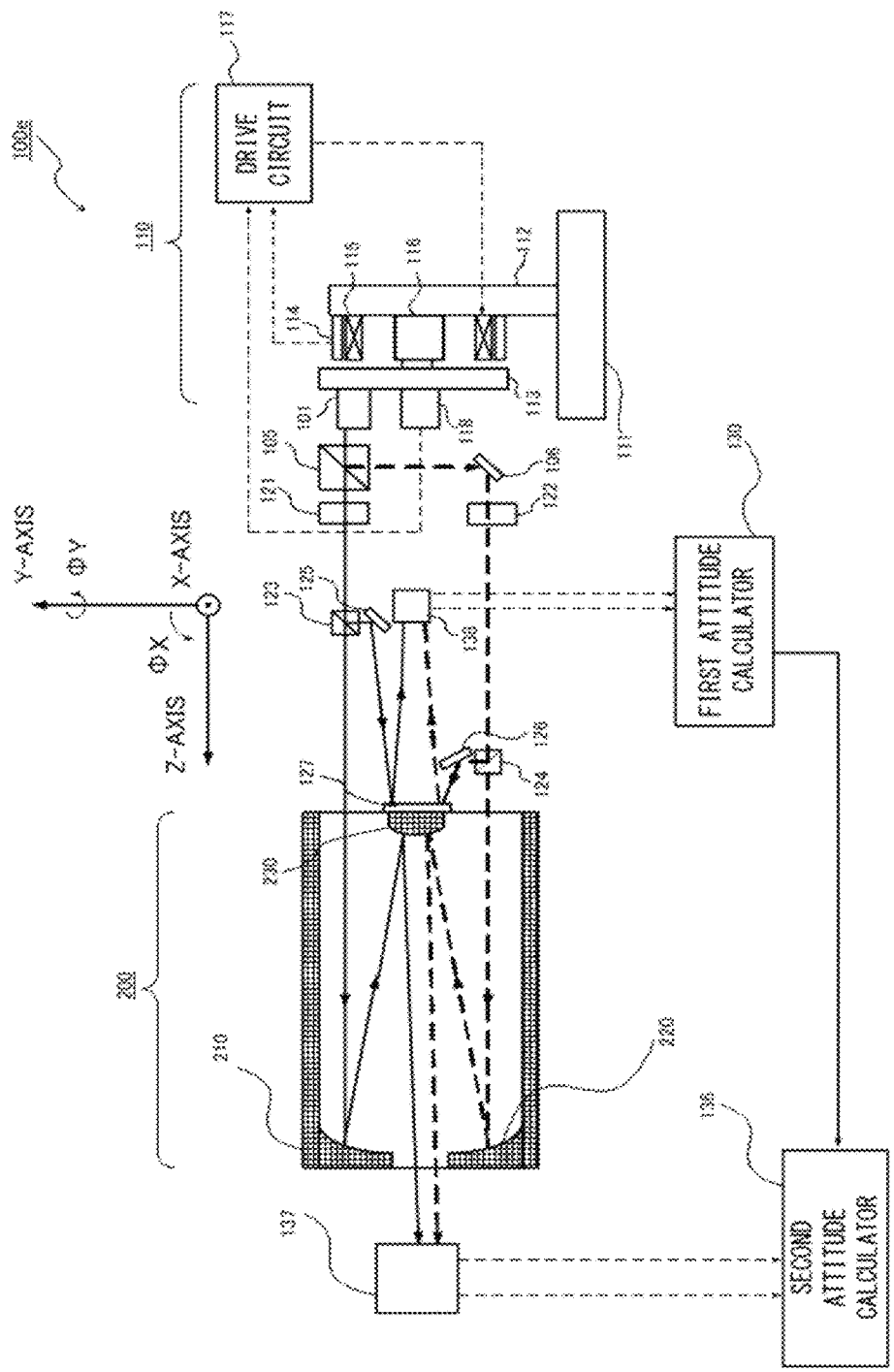
FIG. 9 is a diagram illustrating a configuration of a pointing variation measuring system according to Embodiment 6 of the present disclosure.

FIG. 9 illustrates a configuration of a pointing variation measuring system 100e according to Embodiment 6. Here, two beams of laser light are produced from laser light output by a single laser light source 101b, using a beam splitter 105 and a reflector 106.

In addition, the number of laser light detectors is reduced using a laser light detector 138 and a laser light detector 137 that are CCD or CMOS detection sensors. This simplifies the system configuration.

Embodiment 7

The pointing variation measuring system 100 according to Embodiment 1 as illustrated in FIG. 1 includes a plurality of detectors including the first laser light detector 128, the second laser light detector 129, the third laser light detector 134, the fourth laser light detector 135, and the like. However, the possibility remains that the attitudes of these detectors themselves change (vary). Such changes of the attitudes of the detectors themselves affect the respective output values of the detectors, which may prevent accurate measurement.

Figure 10:
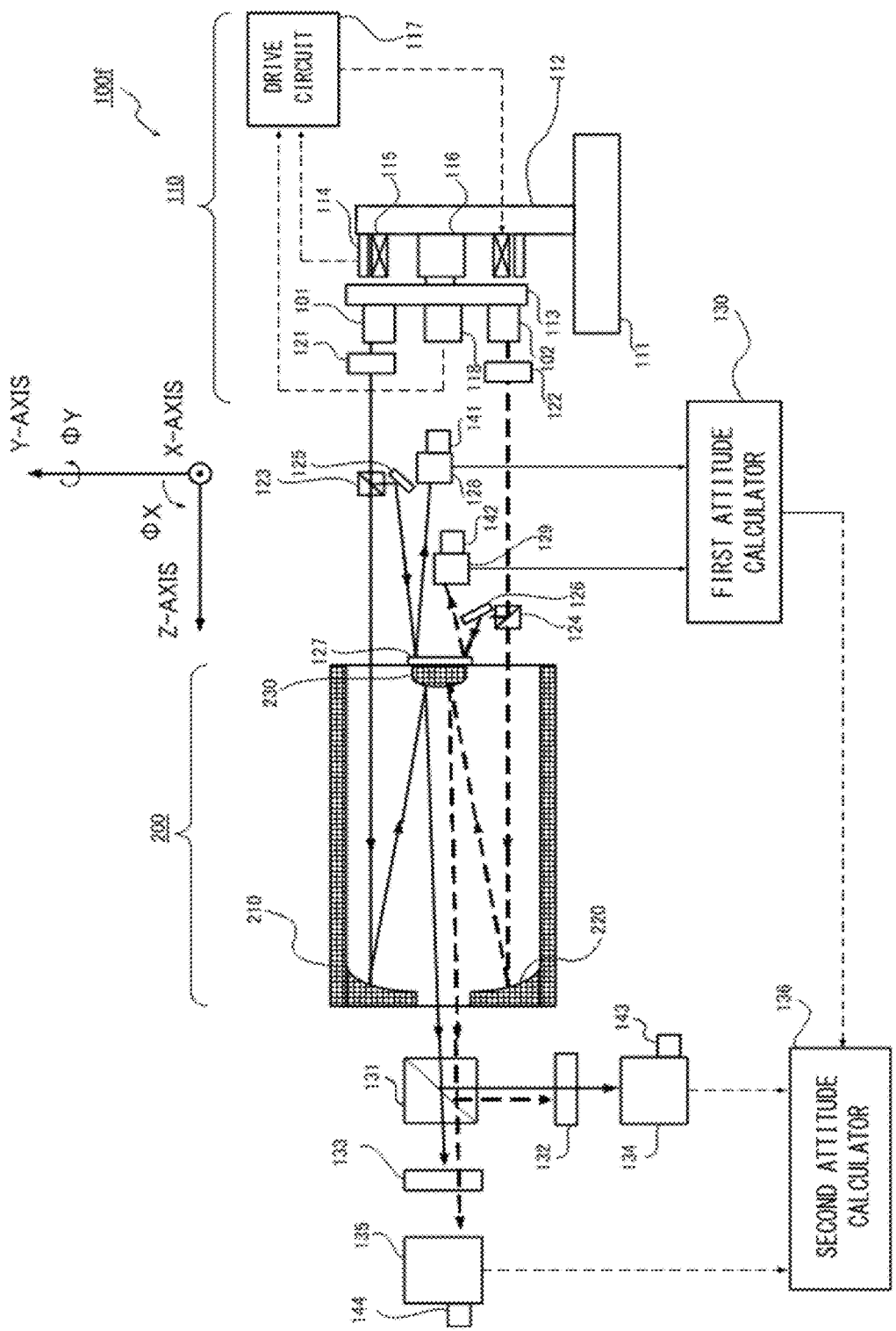
FIG. 10 is a diagram illustrating a configuration of a pointing variation measuring system according to Embodiment 7 of the present disclosure.

To avoid this concern, inertial sensors may be disposed in the respective detectors. FIG. 10 illustrates a configuration of a pointing variation measuring system 100f according to Embodiment 7.

Here, a first detector inertial sensor 141 is mounted to the first laser light detector 128, a second detector inertial sensor 142 is mounted to the second laser light detector 129, a third detector inertial sensor 143 is mounted to the third laser light detector 134, and a fourth detector inertial sensor 144 is mounted to the fourth laser light detector 135.

The inertial sensor mounted to each of the detectors measures an amount of attitude variation of the detector. Then, the amount of attitude variation of the detector itself measured by the inertial sensor can be subtracted from the output value of the detector to remove the attitude variation of the detector itself from the output value of the detector. That is, an accurate measurement can be obtained that does not include the amount of attitude variation of the detector itself.

Figure 11:
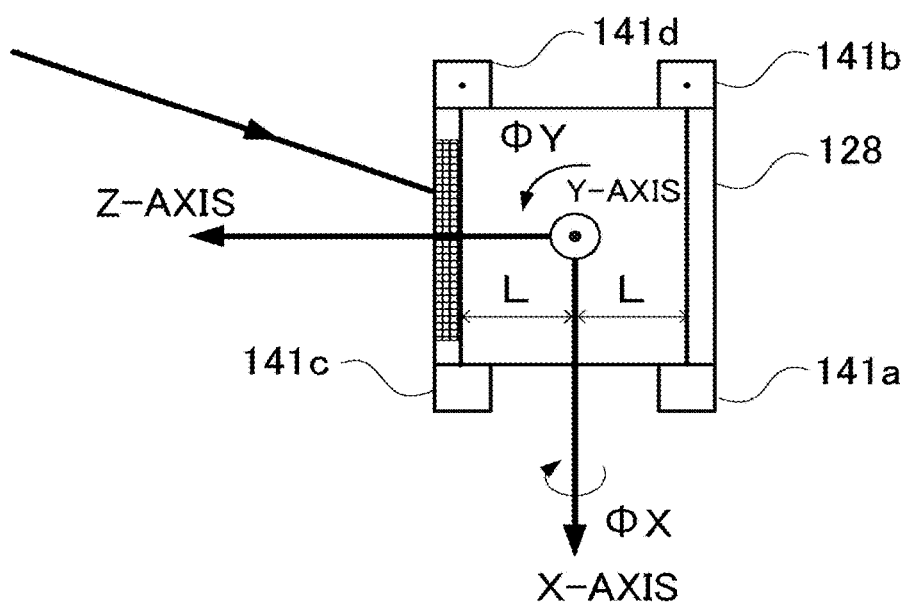
FIG. 11 is a top view illustrating arrangement of a detector inertial sensor according to Embodiment 7.

In the example illustrated in FIG. 11, for example, inertial sensors such as four acceleration sensors (first detector inertial sensors 141a-141d) and the like are mounted to the first laser light detector 128 as the first detector inertial sensor 141.

Here, both the first detector inertial sensor 141a and the first detector inertial sensor 141c have sensitivity in the +X-axis direction. Both the first detector inertial sensor 141b and the first detector inertial sensor 141d have sensitivity in the +Y-axis direction.

Thus, the first detector inertial sensor 141a and the first detector inertial sensor 141c detect the X-axis translation and Y-axis rotation of the first laser light detector 128. The first detector inertial sensor 141b and the first detector inertial sensor 141d detect the X-axis rotation and Y-axis translation of the first laser light detector 128.

A distance between the X-axis passing through the center of rotation of the first laser light detector 128 and the center of rotation of the first detector inertial sensor 141 is denoted by L, the output of the first detector inertial sensor 141a is denoted by $S_a$, the output of the first detector inertial sensor 141b is denoted by $S_b$, the output of the first detector inertial sensor 141c is denoted by $S_c$, and the output of the first detector inertial sensor 141d is denoted by $S_d$. For the attitude variation of the first laser light detector 128, the translation in the X-axis direction is denoted by $\Delta x$, the translation in the Y-axis direction is denoted by $\Delta y$, the rotation around the X-axis is denoted by $\varphi x$, and the rotation around the Y-axis is denoted by $\varphi y$. The outputs $S_a$–$S_d$ of the respective inertial sensors may be expressed as follows.

$$\begin{bmatrix} S_a \\ S_b \\ S_c \\ S_d \end{bmatrix} = \begin{bmatrix} 1 & 0 & 0 & -L \\ 0 & 1 & L & 0 \\ 1 & 0 & 0 & L \\ 0 & 1 & -L & 0 \end{bmatrix} \begin{bmatrix} \Delta x \\ \Delta y \\ \phi x \\ \phi y \end{bmatrix} \quad \text{[Equation 17]}$$

Determining the inverse of Equation 17 gives the following equation.

$$\begin{bmatrix} \Delta x \\ \Delta y \\ \phi x \\ \phi y \end{bmatrix} = \begin{bmatrix} \frac{1}{2} & 0 & \frac{1}{2} & 0 \\ 0 & \frac{1}{2} & 0 & \frac{1}{2} \\ 0 & \frac{1}{2L} & 0 & -\frac{1}{2L} \\ -\frac{1}{2L} & 0 & -\frac{1}{2L} & 0 \end{bmatrix} \begin{bmatrix} S_a \\ S_b \\ S_c \\ S_d \end{bmatrix} \quad \text{[Equation 18]}$$

An amount of attitude variation of four degrees of freedom of the first laser light detector 128 itself may be calculated by performing the calculation of Equation 18 using the outputs $S_a$–$S_d$ of the respective inertial sensors.

An accurate detected value of the first laser light detector 128 may be determined by subtracting the amount of attitude variation of four degrees of freedom, determined from Equation 18, of the first laser light detector 128 itself from the output of the first laser light detector 128.

Similarly, the inertial sensors are also mounted to the second laser light detector 129, the third laser light detector 134, and the fourth laser light detector 135 to determine the amount of attitude variation of the individual detector. The amount of attitude variation of the detector itself is subtracted from each detected value to obtain an accurate detected value. Such configuration enables more highly precise measurement.

The present disclosure is not limited to the above mentioned embodiments, and various modifications and applications are possible.

For example, although the polarizing plates 121 and 122 are disposed between the laser light sources 101 and 102 and the beam splitters 123 and 124 in Embodiment 1, the polarizing plates 121 and 122 may be disposed on the optical path between the beam splitters 123 and 124 and the primary minor 220.

Other configurations of the stabilizing apparatus 110 may be adopted if the stable attitude for irradiating laser light is ensured. In some cases, the stabilizing apparatus may be optional.

In the above mentioned embodiments, a scheme to split laser light into a p-polarized wave and an s-polarized wave is adopted to prevent the laser light from multiple laser light sources from being mixed in a measurement system. However, the scheme to split laser light is freely selectable. For example, laser light having different wavelengths may be separated into multiple beams of laser light using optical filters.

Although the secondary minor attitude detection minor 127 is disposed on the rear surface of the secondary minor 230 (non-reflective surface, which is a surface not corresponding to the primary minor 220), other position, orientation, and configuration of the secondary minor attitude detection minor 127 may be optional as long as the rotation angle (rotation amount) and the translation amount of the secondary minor 230 can be measured. For example, the side surface of the secondary minor 230 may be used as the secondary minor attitude detection minor 127.

Although the two-way beam splitter for laser input is used, a three or more-way beam splitter may be used.

In the aforementioned embodiment, the first laser light detector 128, the second laser light detector 129, the third laser light detector 134, and the fourth laser light detector 135 detect incident points and incident angles of laser light, but may measure other physical amounts (parameters) such as a light intensity distribution or the like, which are convertible into an incident point and angle, or the attitude may be determined based on the received laser light using any other scheme.

A Cassegrain-type telescope 200 is exemplified as a target to be measured, but any other optical system can be a target to be measured if the optical system includes a primary minor and a secondary minor.

Embodiment 8

Techniques of the present disclosure are not limited to ground test application as described in the above mentioned embodiments, but may be provided aboard a spacecraft. When a satellite on-board telescope points toward a target to be observed of a celestial object such as the Earth, observation light from the observation target enters the telescope and is reflected by a primary minor and a secondary minor before entering a sensor unit. Degradation in pointing accuracy of the telescope may be caused by a reaction wheel, a solar array wing, an inertial navigation system, or the like, which have to be driven at all times during satellite operation. The driving of such devices produces vibrations, which become sources of disturbance. If the vibration is transmitted to a telescope unit, the attitudes of the primary minor and the secondary minor change, and the pointing precision of the telescope is degraded. Thus, continuous monitoring is required for the attitudes of the primary minor and the secondary minor of the telescope.

If the vibration transmitted to the telescope unit is in a relatively low frequency range of an order of a few Hz, the attitude variation of the telescope unit is considered as substantially the same as the attitude variation of a satellite bus unit since the telescope unit and the satellite bus unit can be assumed to be rigid. When the oscillation frequency is in a low frequency range, the attitude variation of the telescope unit may be estimated by an inertial sensor mounted in the satellite bus unit.

However, when the oscillation frequency is tens of Hz or more in an intermediate to high frequency range, the telescope unit and the satellite bus unit cannot be assumed to be rigid, and the units have different attitude variations. Thus, the attitude variation of the telescope unit cannot be estimated by the inertial sensor mounted in the satellite bus unit.

Hence, implementing a pointing variation measuring system according to the present disclosure enables real-time estimation of the attitude variation of the telescope unit in the low to high frequency range even in the disturbed environment that occurs during satellite operation.

Figure 12:
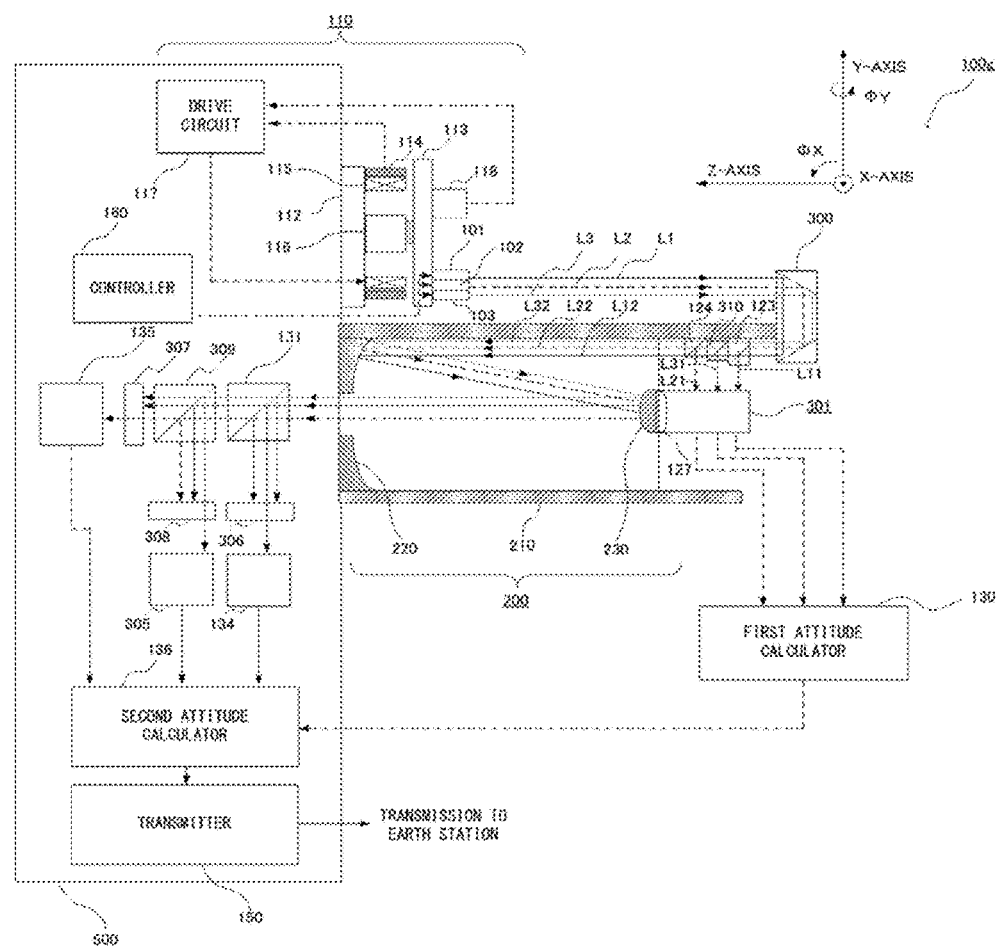
FIG. 12 is a diagram illustrating a configuration of a pointing variation measuring system according to Embodiment 8 of the present disclosure.

FIG. 12 illustrates a configuration of a pointing variation measuring system 100g according to Embodiment 8. The pointing variation measuring system 100g causes laser light to enter a tube 210 of a telescope 200 and detects amounts of attitude variation of a primary minor 220 and a secondary minor 230, similarly to the above-mentioned embodiments. The telescope 200 has a configuration similar to that of Embodiment 1. The following description focuses on the parts of the configuration that differ from those of the pointing variation measuring system 100 according to Embodiment 1 as illustrated in FIG. 1.

Since Embodiment 1 envisions application in a ground test, the stabilizing apparatus 110 having the first laser light source 101 and the second laser light source 102 mounted is disposed in a position to oppose the objective of the telescope 200. However, Embodiment 8 envisions using during satellite operation, so the stabilizing apparatus 110 is disposed at the side surface of the satellite bus unit 500 so as not to prevent observation by the telescope 200. The laser light is reflected by a reflector (corner-cube reflector 300) and enters the tube 210 of the telescope 200. The corner-cube reflector 300 is described below.

In Embodiment 1, p-wave laser light and s-wave laser light are produced from single-wavelength laser light. However, due to the effects of disturbances occurring during satellite operation, at least three beams of laser light to enter the telescope are necessary for estimation of the amounts of attitude variation associated with two-axis translation and rotation of the telescope unit. Arrangements for four or more beams of laser light may be adopted as a redundant configuration, but a lightweight and low-cost arrangement is desired on the premise of installation in a spacecraft. Thus, an arrangement for entry of three beams of laser light is described in Embodiment 8. Even when the number of laser light beams entering the telescope is three or four, the estimation technique of the attitude variation associated with two-axis translation and rotation of the telescope unit is the same. However, the matrix formula for converting the laser detected value into the attitude variation by the calculator changes.

As illustrated in FIG. 12, a first laser light source 101, a second laser light source 102, and a third laser light source 103 are mounted on a pivoting part 113 of the stabilizing apparatus 110. The laser light output by the first laser light source 101, the second laser light source 102, and the third laser light source 103 is collimated light. The first laser light source 101, the second laser light source 102, and the third laser light source 103 are connected to a controller 160, and output laser light as instructed by the controller 160. The three laser light sources emit beams of laser light having different wavelengths so that each of the three beams of laser light can be identified at a detection side. For example, lasers of three wavelengths may be used, such as 632.8 nm, 694.3 nm, and 840 nm. The first laser light source 101, the second laser light source 102, and the third laser light source 103 are disposed together on a disk of the pivoting part 113. This is to cause all the beams of laser light emitted by the first laser light source 101, the second laser light source 102, and the third laser light source 103 to enter the corner-cube reflector 300 mentioned below.

Operation of a local sensor 114, an actuator 115, and an inertial sensor 118 is similar to that in Embodiment 1. A drive circuit 117 controls the actuator 115 based on measurements of the local sensor 114 and the inertial sensor 118 to stabilize the pivoting part 113. This stabilization reduces attitude changes of the first laser light source 101 and the second laser light source 102 due to vibrations transmitted from the satellite bus unit 500.

As illustrated, the corner-cube reflector (hereinafter referred to as a corner cube) 300 is disposed at an end portion of an objective side of the tube 210, opposing the exit apertures of the first laser light source 101, the second laser light source 102, and the third laser light source 103. Beams of laser light L1 L2, L3 emitted in the −Z direction by the first laser light source 101, the second laser light source 102, and the third laser light source 103 are reflected by the corner cube 300 and travel in the +Z direction.

In addition, a first beam splitter 123, a second beam splitter 124, and a fourth beam splitter 310 are disposed on optical paths of the laser light L1, L2, L3 reflected by the corner-cube reflector 300 and traveling in the +Z direction. In the illustrated example, the first beam splitter 123, the second beam splitter 124, and the fourth beam splitter 310 are located at the end portion of the tube 210 of the objective side at the inner surface of the tube 210.

The first beam splitter 123 splits, into two beams, the laser light corresponding to the output wavelength of the first laser light source 101. The second beam splitter 124 splits, into two beams, the laser light corresponding to the output wavelength of the second laser light source 102. The fourth beam splitter 310 splits, into two beams, the laser light corresponding to the output wavelength of the third laser light source 103.

The laser light L1 emitted by the first laser light source 101 is split into beams of laser light L11 and L21 by the first beam splitter 123. The laser light L1 travels in the −Y direction. The laser light L12 travels in the +Z direction. The laser light L2 emitted by the second laser light source 102 is split by the second beam splitter 124 into laser light L21 travelling in the −Y direction and laser light L22 travelling in the +Z direction. The laser light L3 emitted by the third laser light source 103 is split by the fourth beam splitter 310 into laser light L31 travelling in the −Y direction and laser light L32 travelling in the +Z direction.

The beams of laser light L11, L21, and L31 travelling in the −Y direction enter an attitude detector 301.

The attitude detector 301 is attached to a non-reflective surface of a secondary minor 230. The attitude detector 301 detects the attitude of the secondary minor 230 using the received beams of laser light L11, L21, and L31.

Figure 13:
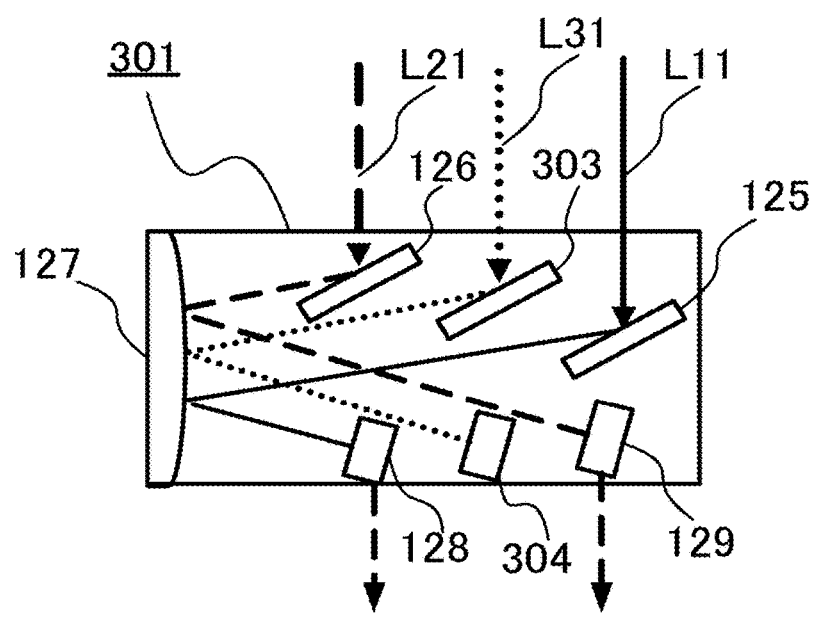
FIG. 13 is a diagram illustrating a configuration of an attitude detector according to Embodiment 8.

FIG. 13 illustrates configuration of the interior of the attitude detector 301. The laser light L11 entering the attitude detector 301 is reflected by a reflector 125 and a secondary minor attitude detection minor 127, and enters a first laser light detector 128. The first laser light detector 128 measures an incident point and an incident angle of the received laser light L11 and outputs the measurement to a first attitude calculator 130. Similarly, a second laser light detector 129 measures an incident point and an incident angle of the laser light L21 reflected by a reflector 126 and the secondary minor attitude detection minor 127, and outputs the measurement to the first attitude calculator 130. Similarly, a fifth laser light detector 304 measures an incident point and an incident angle of the laser light L31 reflected by a reflector 303 and the secondary minor attitude detection minor 127, and outputs the measurement to the first attitude calculator 130. The first attitude calculator 130 calculates an amount of attitude variation of the secondary minor 230 in a similar manner to that of Embodiment 1.

The beams of laser light L12, L22, and L32 travelling in the +Z direction enter the tube 210. The beams of laser light L12, L22, and L32 are reflected by a primary minor 220 and a secondary minor 230 before passing through an eyepiece, and travel out of the tube 210.

In Embodiment 8, since the beams of laser light used have three different wavelengths, two beam splitters 131 and 309, and three band pass filters 306, 307, and 308, and three laser light detectors 134, 135, and 305 are disposed at the eyepiece side of the telescope 200. The band pass filters 306, 307, and 308 transmit only beams of laser light output respectively by the first laser light source 101, the second laser light source 102, and the third laser light source 103. The beam splitter 131 splits the laser light exiting from the eyepiece of the tube 210 into laser light travelling in the −Y direction and laser light travelling in the Z direction.

The laser light travelling in the −Y direction enters the band pass filter 306. Among the beams of laser light incident on the band pass filter 306, only the beam of laser light having the output wavelength of the first laser light source 101 passes through the band pass filter 306 and enters the third laser light detector 134. The third laser light detector 134, which includes a PSD sensor, measures an incident point and an incident angle of the received laser light, and outputs the measurements to a second attitude calculator 136.

The laser light exiting from the beam splitter 131 and travelling in the Z direction enters the beam splitter 309. The beam splitter 309 splits the laser light exiting from the beam splitter 131 in the Z direction into two beams of laser light in the −Y direction and in the Z direction. The laser light split by the beam splitter 309 and travelling in the Z direction enters the band pass filter 307. Among the beams of laser light incident on the band pass filter 307, only the beam of laser light having the output wavelength of the second laser light source 102 passes through the band pass filter 307 and enters the fourth laser light detector 135. The fourth laser light detector 135, which includes a PSD sensor, measures an incident point and an incident angle of the received laser light, and outputs the measurements to the second attitude calculator 136.

In addition, among the laser light beams split by the beam splitter 309 and travelling in the −Y direction, only the laser light having the output wavelength of the third laser light source 103 passes through the band pass filter 308 and enters a sixth laser light detector 305. The sixth laser light detector 305, which includes a PSD sensor, measures an incident point and incident angle of the received laser light, and outputs the measurement to the second attitude calculator 136.

Such arrangements enable splitting of beams of laser light having three wavelengths. Thus, the third laser light detector 134, the fourth laser light detector 135, and the sixth laser light detector 305 measure incident points and incident angles of the beams of laser light output by the respective different laser light sources.

Similarly as in Embodiment 1, the outputs of the third laser light detector 134, the fourth laser light detector 135, and the sixth laser light detector 305 are affected both by the attitude variation due to rotation around the X-axis and translation in the Y-axis direction of the secondary minor 230 and by the attitude variation due to rotation around the X-axis and translation in the Y-axis direction of the primary minor 220. Thus, the second attitude calculator 136 calculates an amount of attitude variation of the primary minor 220 based on the measurements output by the third laser light detector 134, the fourth laser light detector 135, and the sixth laser light detector 305, and the amount of attitude variation of the secondary minor 230 supplied by the first attitude calculator 130.

The second attitude calculator 136 outputs, to a transmitter 150, the amount of attitude variation of the secondary minor 230 supplied by the first attitude calculator 130 and the determined amount of attitude variation of the primary minor 220.

The transmitter 150 includes an antenna, a transmitter-receiver, and the like, and communicates with an earth station.

The transmitter 150 adds, for example, time information such as transmission time to information indicating an amount of attitude variation of the primary minor 220 and an amount of attitude variation of the secondary minor 230, and transmits the information to the earth station. Thus, the earth station is capable of obtaining, in substantially real time, the amount of attitude variation of the primary minor 220 and the amount of variation attitude of the secondary minor 230 of the telescope 200 aboard the satellite.

Mounting the pointing variation measuring system 100g on a spacecraft such as a satellite or the like thus enables estimation of individual attitude variation of the primary minor and the secondary minor of the spacecraft on-board telescope.

The light entering the tube 210 is a collection of the observation light and the laser light L1, L2, and L3. Thus, the third laser light detector 134, the fourth laser light detector 135, and the sixth laser light detector 305 also receive mixed light of the observation light and the laser light. To prevent reduction in detection accuracy of detectors, a heterodyne detection scheme may be used as the third laser light detector 134, the fourth laser light detector 135, and the sixth laser light detector 305. The heterodyne detection scheme is known not to degrade the detection accuracy of detectors even when the received light includes light having a wavelength other than that of the laser light. In addition, with this heterodyne detection scheme, relatively small power of laser light may be used, and the effect on an observation sensor for detecting the observation light may be reduced.

Rigid connections of at least the light receiving surfaces of the first laser light detector 128 and the second laser light detector 129 to the telescope 200 are required. If the attitude variation occurs with respect to the telescope 200 without such a rigid connection, an inertial sensor provided for each laser light detector is necessary to measure the attitude variation and subtract the attitude variation of each laser light detector itself from the detected value of the laser light detector. Similarly, rigid connection of at least the light receiving surfaces of the detectors to a satellite bus unit 500 is required for the third laser light detector 134 and the fourth laser light detector 135. If the attitude variation occurs with respect to the satellite bus unit 500 without such rigid connection, an inertial sensor provided for each laser light detector is necessary to measure the attitude variation and subtract the attitude variation of each laser light detector itself from the detected value of the laser light detector.

Embodiment 9

Although the three laser light sources are mounted on the pivoting part 113 of the stabilizing apparatus 110 in Embodiment 8 above, furthermore, from the standpoints of weight and cost reduction, two laser light sources having different wavelengths may be mounted on the pivoting part 113. For such two-laser light source arrangement, similarly to that of Embodiment 3, the laser light output by a single laser light source is split into two beams of laser light using a beam splitter and a reflecting plate, and the beams each are divided into p-wave and s-wave components using the corresponding polarizing plate, thereby enabling identification of the beams at the detector side.

Embodiment 10

Figure 14:
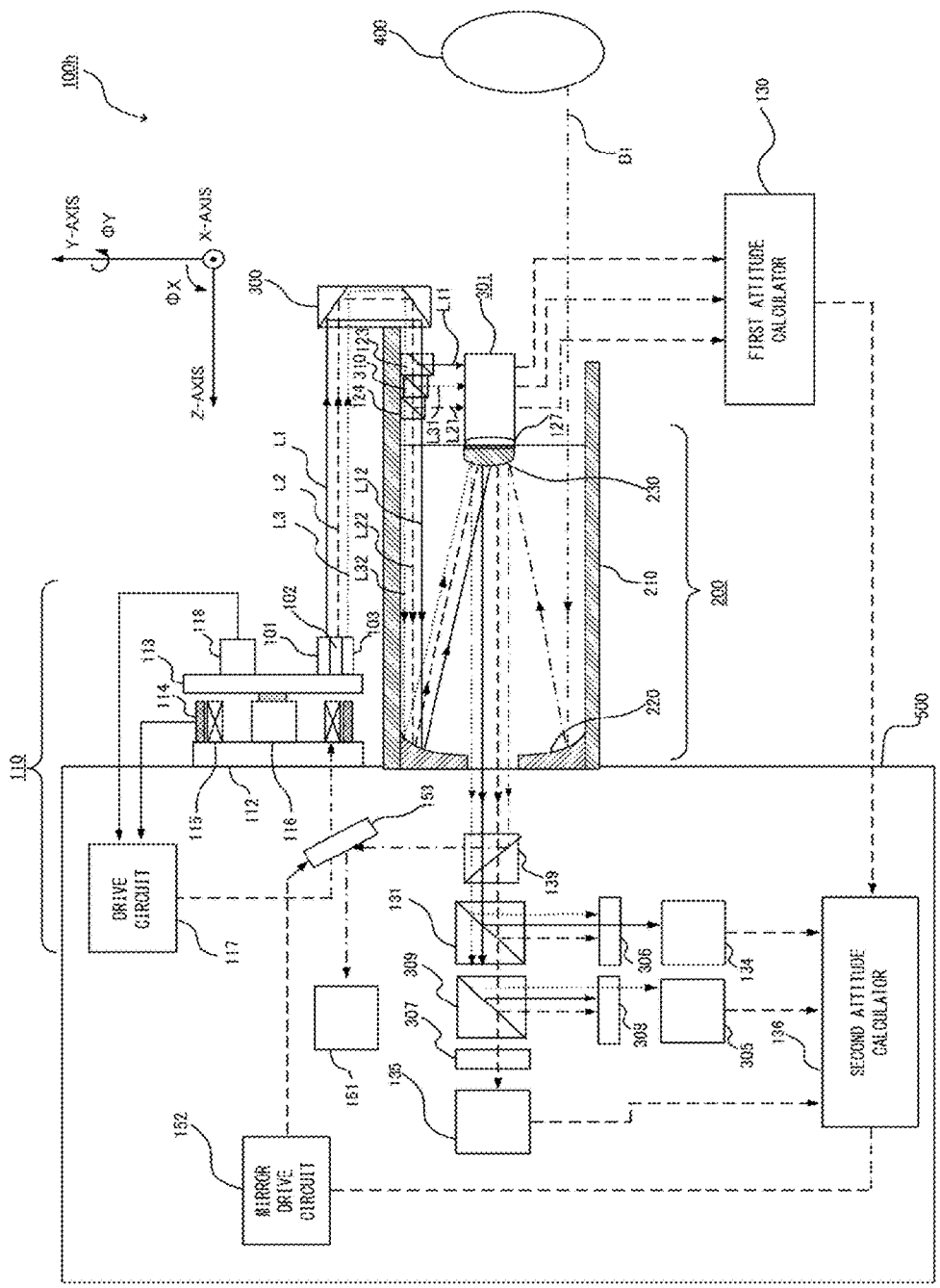
FIG. 14 is a diagram illustrating a configuration of a pointing variation measuring system according to Embodiment 10 of the present disclosure.

In Embodiment 8 above, mounting the pointing variation measuring system on the satellite enables on-board estimation of the amount of attitude variation of the on-board telescope. A pointing minor 153, which includes a rotation mechanism, is positioned on a path of observation light, thereby enabling correction of pointing error based on the estimated value of the pointing axis. FIG. 14 illustrates a configuration of a pointing variation measuring system 100h according to Embodiment 10.

Observation light B1 from a target 400 to be observed of a celestial object such as the Earth enters a telescope unit, and is reflected by a primary minor 220 and a secondary minor 230. The observation light B1 exiting from the telescope unit is split by a beam splitter 139 to be split from the path of laser light, and directed via the pointing minor 153 to be received by an image sensor 151. The pointing minor 153 is capable of driving in two-axis rotation, and is controlled to eliminate a deviation of the attitude of the telescope unit. In other words, in the configurations of Embodiments 1 and 3, the pointing minor 153 is controlled to correct the angular deviation in the X-axis rotational direction with a combination of the attitude variations of the primary minor and the secondary minor, whereas in the configurations of Embodiments 2 and 4, the pointing minor 153 is controlled to correct the angular deviation in the X-axis rotational direction and the Y-axis rotational direction.

Assuming that the satellite has a pointing error of the order of a few μrad (which corresponds to a ground resolution of a few meters, at an altitude of 400 km), the pointing minor 153 could require the band of approximately a few hundred Hz, depending on the frequency characteristics of the disturbance. Driving the pointing minor 153 at a few hundred Hz may in turn require the detectors to have a band that exceeds the band of the pointing minor by one order of magnitude. However, this concern is addressed with a PSD sensor used for a first laser light detector 128, a second laser light detector 129, a fifth laser light detector 304, a third laser light detector 134, a fourth laser light detector 135, and a sixth laser light detector 305.

When the observation light is collimated light, using the attitude of the primary minor in the two-axis translational direction ($\Delta X_{PM}$, $\Delta Y_{PM}$), the attitude variation of the primary minor in the two-axis rotational direction ($\Delta \theta_{X\_PM}$, $\Delta \theta_{Y\_SM}$), the attitude variation of the secondary minor in the two-axis translation direction ($\Delta X_{SM}$, $\Delta Y_{SM}$), and the attitude variation of the secondary minor in the two-axis rotational direction ($\Delta \theta_{X\_SM}$, $\Delta \theta_{Y\_SM}$), all of which are calculated by the second attitude calculator 136, a pointing axis variation $\theta_{X\_err}$ in the X-axis direction and a pointing axis variation $\theta_{Y\_err}$ in the Y-axis direction for the on-board telescope can be expressed in the following equation.

$$\begin{bmatrix} \theta_{X\_err} \\ \theta_{Y\_err} \end{bmatrix} = T_{PM} \cdot \begin{bmatrix} \Delta X_{PM} \\ \Delta Y_{PM} \end{bmatrix} + R_{PM} \cdot \begin{bmatrix} \Delta \theta_{Y\_PM} \\ \Delta \theta_{X\_PM} \end{bmatrix} + \\ T_{SM} \cdot \begin{bmatrix} \Delta X_{SM} \\ \Delta Y_{SM} \end{bmatrix} + R_{SM} \cdot \begin{bmatrix} \Delta \theta_{Y\_SM} \\ \Delta \theta_{X\_SM} \end{bmatrix} + \begin{bmatrix} \theta_{X\_err\_0} \\ \theta_{Y\_err\_0} \end{bmatrix}$$

[Equation 19]

Here, $T_{PM}$ is a sensitivity coefficient of pointing axis variation of the on-board telescope to the attitude variation of the primary minor in the two-axis translational direction, $R_{PM}$ is a sensitivity coefficient of pointing axis variation of the on-board telescope to the attitude variation of the primary minor in the two-axis rotational direction, $T_{SM}$ is a sensitivity coefficient of pointing axis variation of the on-board telescope to the attitude variation of the secondary minor in the two-axis translational direction, $R_{SM}$ is a sensitivity coefficient of pointing axis variation of the on-board telescope to the attitude variation of the secondary minor in the two-axis rotational direction, $\theta_{X\_err\_0}$ is an initial value of pointing axis variation of the on-board telescope in the X-axis direction, and $\theta_{Y\_err\_0}$ is an initial value of pointing axis variation of the on-board telescope in the Y-axis direction. These values are previously registered as known parameters.

Based on the pointing axis variation $\theta_{X\_err}$ in the X-axis direction and the pointing axis variation $\theta_{Y\_err}$ in the Y-axis direction for the on-board telescope, both of which are calculated using the above equation, the minor drive circuit 152 determines the target value of the pointing minor 153 and controls the pointing minor 153.

Specifically, rotation of the pointing minor 153 around the X-axis reduces an amount of pointing axis variation of the on-board telescope in the Y-axis direction, and rotation of the pointing minor 153 around the Y-axis reduces an amount of pointing axis variation of the on-board telescope in the X-axis direction. Hence, the target value of the rotation angle of the pointing minor 153 can be expressed by the following equation.

$$\varphi_{X\_ref} = -\theta_{Y\_err}$$

$$\varphi_{Y\_ref} = \theta_{X\_err}$$

[Equation 20]

Here, $\varphi_{X\_ref}$ is the target value of the X-axis rotation of the pointing minor 153, and $\varphi_{Y\_ref}$ is the target value of the Y-axis rotation of the pointing minor 153

Thus, the satellite with a pointing error measuring system mounted therein includes a pointing minor, and the rotary drive of the pointing minor is thereby controlled based on the pointing axis variation of the on-board telescope estimated by the attitude calculator, which enables suppression of pointing axis variation.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2014-25846, filed on Feb. 13, 2014, the entire disclosure of which is incorporated by reference herein.

REFERENCE SIGNS LIST

110 Stabilizing apparatus
121 First polarizing plate
122 Second polarizing plate
123 First beam splitter
124 Second beam splitter
125 Reflector
126 Reflector
127 Secondary minor attitude detection minor
128 First laser light detector
129 Second laser light detector
130 First attitude calculator
131 Third beam splitter
132 Third polarizing plate
133 Fourth polarizing plate
134 Third laser light detector
135 Fourth laser light detector
136 Second attitude calculator
137 Laser light detector
138 Laser light detector 141 First detector inertial sensor
142 Second detector inertial sensor
143 Third detector inertial sensor
144 Fourth detector inertial sensor
150 Transmitter
153 Pointing minor
160 Controller
200 Telescope
210 Tube
220 Primary minor
230 Secondary minor
300 Corner-cube reflector
301 Attitude detector
304 Fifth laser light detector
305 Sixth laser light detector
306, 307, 308 Band pass filter
309 Beam splitter
310 Fourth beam splitter
500 Satellite bus unit

The invention claimed is:

1. A pointing variation measuring system, comprising:
a secondary mirror attitude detection mirror disposed on a secondary mirror of a reflective condenser optical system, the reflective condenser optical system including a primary mirror and the secondary mirror;
a laser light source to irradiate the reflective condenser optical system with at least two parallel beams of laser light from respective different locations and irradiate the secondary mirror attitude detection mirror with at least two additional beams of laser light from respective different locations;
a first laser light detector to detect each beam of laser light reflected by the secondary mirror attitude detection mirror;
a first attitude calculator to determine, based on a result detected by the first laser light detector, an amount of attitude variation that is a deviation between a reference attitude of the secondary mirror and a current attitude of the secondary mirror;
a third laser light detector to detect each beam of laser light reflected by both of the primary mirror and the secondary mirror after entering the reflective condenser optical system; and
a second attitude calculator to determine, based on a result detected by the third laser light detector and the result detected by the first laser light detector, an amount of attitude variation that is a deviation between a reference attitude of the primary mirror and a current attitude of the primary mirror.

2. The pointing variation measuring system according to claim 1, wherein
the first laser light detector receives each beam of laser light reflected by the secondary mirror attitude detection mirror, and detects an incident point and an incident angle on the first laser light detector of each received beam of laser light reflected by the secondary mirror attitude detection mirror,
the first attitude calculator determines the deviation of the attitude of the secondary mirror based on the incident point and the incident angle of the beam of laser light detected by the first laser light detector,
the third laser light detector receives a beam of laser light reflected by both of the primary mirror and the secondary mirror after entering the reflective condenser optical system, and detects an incident point and an incident angle on the third laser light detector of the received beam of laser light reflected by both of the primary mirror and the secondary mirror, and
the second attitude calculator determines a deviation of the attitude of the primary mirror based on the incident point and the incident angle of the laser light detected by the third laser light detector and the incident point and the incident angle of the laser light detected by the first laser light detector.

3. The pointing variation measuring system according to claim 1, further comprising:
a stabilizer to stabilize laser light output by the laser light source in space regarded as inertial space,
wherein the laser light source is mounted to the stabilizer.

4. The pointing variation measuring system according to claim 1, wherein
the first attitude calculator determines the amount of attitude variation associated with rotation and translation of the secondary mirror, and
the second attitude calculator determines the amount of attitude variation associated with rotation and translation of the primary mirror.

5. The pointing variation measuring system according to claim 1, wherein
the laser light source outputs at least two beams of laser light, and
the pointing variation measuring system further comprises a first laser light splitter to split each of the beams of laser light output by the laser light source into two split beams of laser light, one of the split beams entering the reflective condenser optical system, the other of the split beams being incident on the secondary mirror attitude detection mirror.

6. The pointing variation measuring system according to claim 5, wherein
the laser light source outputs two beams of laser light including first laser light and second laser light,
the pointing variation measuring system further comprising:
a first polarizer and a second polarizer to transmit only light having a first polarization component; and
a third polarizer and a fourth polarizer to transmit only a second polarization component different from the first polarization component, wherein
the first polarizer transmits only the first polarization component of one beam of the laser light output by the laser light source, and causes the transmitted component to enter the first laser light splitter,
the third polarizer transmits only the second polarization component of the other beam of the laser light output by the laser light source, and causes the transmitted component to enter the first laser light splitter,
the second polarizer transmits only the first polarization component of the laser light reflected by the primary mirror and the secondary mirror after entering the reflective condenser optical system, and causes the transmitted component to enter the third laser light detector,
the fourth polarizer transmits only the second polarization component of the laser light reflected by the primary mirror and the secondary mirror after entering the reflective condenser optical system, and causes the transmitted component to enter the third laser light detector,
the third laser light detector includes two laser light detectors, one of the two laser light detectors detects the first polarization component entering from the second polarizer, and the other of the two laser light detectors detects only the second polarization component entering from the fourth polarizer.

7. The pointing variation measuring system according to claim 5, wherein the laser light source outputs first laser light, second laser light, and third laser light, all of which have different wavelengths, the pointing variation measuring system further comprising:

a first filter and a fourth filter to transmit only the first laser light;

a second filter and a fifth filter to transmit only the second laser light; and a third filter and a sixth filter to transmit only the third laser light, wherein the first filter transmits only the first laser light output by the laser light source to cause the transmitted first laser light to enter the first laser light splitter, the second filter transmits only the second laser light output by the laser light source to cause the transmitted second laser light to enter the first laser light splitter, the third filter transmits only the third laser light output by the laser light source to cause the transmitted third laser light to enter the first laser light splitter, the fourth filter transmits only the first laser light of the laser light reflected by the primary mirror and the secondary mirror after entering the reflective condenser optical system, and causes the transmitted first laser light to enter the third laser light detector, the fifth filter transmits only the second laser light of the laser light reflected by the primary mirror and the secondary mirror after entering the reflective condenser optical system, and causes the transmitted second laser light to enter the third laser light detector, the sixth filter transmits only the third laser light of the laser light reflected by the primary mirror and the secondary mirror after entering the reflective condenser optical system, and causes the transmitted third laser light to enter the third laser light detector, the third laser light detector includes a first detector, a second detector, and a third detector, the first detector detects only the first laser light entering from the fourth filter, the second detector detects only the second laser light entering from the fifth filter, and the third detector detects only the third laser light entering from the sixth filter.

8. The pointing variation measuring system according to claim 1, wherein the first laser light detector and the third laser light detector each include an inertial sensor, the inertial sensors measure an amount of attitude variation of each detector included in the first laser light detector and the third laser light detector, and the amount of attitude variation each determined by the first laser light detector and the third laser light detector is corrected based on the amount of attitude variation measured by the inertial sensor.

9. The pointing variation measuring system according to claim 1, further comprising:

a reflector disposed to oppose the laser light source and configured to change an optical path of received laser light, wherein the laser light source outputs a plurality of mutually parallel beams of laser light to the reflector, and the reflector changes the optical path of the received laser light to enter a first laser light splitter.

10. The pointing variation measuring system according to claim 9, further comprising:

a stabilizer to stabilize the laser light output by the laser light source in space regarded as inertial space, the laser light source being mounted to the stabilizer, the stabilizer being disposed at a bus, wherein the pointing variation measuring system further comprises a transmitter to transmit, to an earth station, the amount of attitude variation of the secondary mirror determined by the first attitude calculator and the amount of attitude variation of the primary mirror determined by the second attitude calculator.

11. A satellite including the pointing variation measuring system according to claim 10 on board of the satellite.

12. The pointing variation measuring system according to claim 9, further comprising:

a stabilizer to stabilize the laser light output by the laser light source in space regarded as inertial space, the laser light source being mounted to the stabilizer, the stabilizer being disposed at a bus, wherein the pointing variation measuring system further comprising a pointing mirror, and a pointing mirror drive circuit to drive the pointing mirror, and wherein the mirror drive circuit drives, based on the amount of attitude variation of the secondary mirror calculated by the first attitude calculator and the amount of attitude variation of the primary mirror calculated by the second attitude calculator, the pointing mirror to counteract a deviation of a pointing axis of the reflective condenser optical system caused by a change in attitudes of the secondary mirror and the primary mirror.

13. A satellite including the pointing variation measuring system according to claim 12 on board of the satellite.

14. A pointing variation measuring method, comprising:

causing at least two parallel beams of laser light to enter a reflective condenser optical system including a primary mirror and a secondary mirror from respective different locations, and causing at least two additional parallel beams of laser light to be incident on a secondary mirror attitude detection mirror disposed on a non-reflective surface of the secondary mirror from respective different locations;

detecting each beam of laser light reflected by the secondary mirror attitude detection mirror, and determining, based on a result of the detection, a deviation between a reference attitude of the secondary mirror and a current attitude of the secondary mirror; and detecting each beam of the laser light reflected by both of the primary mirror and the secondary mirror after entering the reflective condenser optical system, and determining a deviation between a reference attitude of the primary mirror and a current attitude of the primary mirror based on a result of the detection and the detected result of each beam of the laser light reflected by the secondary mirror attitude detection mirror.

* * * * *